(12) United States Patent
Madhavan

(10) Patent No.: US 11,687,558 B2
(45) Date of Patent: *Jun. 27, 2023

(54) SELECTIVELY REPLICATED TRUSTLESS PERSISTENT STORE

(71) Applicant: Chicago Mercantile Exchange Inc., Chicago, IL (US)

(72) Inventor: Ajay Sunderajan Madhavan, Aurora, IL (US)

(73) Assignee: Chicago Mercantile Exchange Inc., Chicago, IL (US)

(*) Notice: Subject to any disclaimer, the term of this patent is extended or adjusted under 35 U.S.C. 154(b) by 169 days.

This patent is subject to a terminal disclaimer.

(21) Appl. No.: 17/244,327

(22) Filed: Apr. 29, 2021

(65) Prior Publication Data

US 2021/0248158 A1 Aug. 12, 2021

Related U.S. Application Data

(63) Continuation of application No. 16/196,257, filed on Nov. 20, 2018, now Pat. No. 11,023,490.

(51) Int. Cl.
*G06F 16/27* (2019.01)
*G06F 16/23* (2019.01)
*G06F 16/21* (2019.01)
*G06F 21/62* (2013.01)
*H04L 9/40* (2022.01)

(52) U.S. Cl.
CPC .......... *G06F 16/27* (2019.01); *G06F 16/212* (2019.01); *G06F 16/2379* (2019.01); *G06F 21/6227* (2013.01); *H04L 63/123* (2013.01)

(58) Field of Classification Search
CPC .... G06F 16/27; G06F 16/2379; G06F 16/212; G06F 21/6227; G06F 21/602; G06F 2221/2107; G06F 16/273; H04L 63/123; H04L 2209/56; H04L 9/50; H04L 9/3236; G06Q 2220/00; G06Q 20/3823; G06Q 20/382
USPC ........................................................ 707/615
See application file for complete search history.

(56) References Cited

U.S. PATENT DOCUMENTS

| 7,296,023 | B2 | 11/2007 | Geyer et al. |
| 7,734,927 | B2 | 6/2010 | Stewart et al. |
| 7,937,482 | B1 | 5/2011 | Vermeulen et al. |
| 8,051,491 | B1 | 11/2011 | Cavage et al. |
| 8,121,990 | B1 | 2/2012 | Chapweske et al. |

(Continued)

OTHER PUBLICATIONS

"Distributed Concurrence Ledgers", Whitepaper, Packet Dynamics LLC, Feb. 23, 2016, 7 pages.
(Continued)

*Primary Examiner* — Evan Aspinwall
(74) *Attorney, Agent, or Firm* — Lempia Summerfield Katz LLC

(57) ABSTRACT

A computer implemented method and system for a selectively replicated trustless persistent store is provided using a bilateral distributed ledger. The selectively replicated trustless persistent store synchronizes current state data stores shared among multiple parties. Data modifications may be made in any shared store locally and then are automatically replicated across other permissioned stores. The selectively replicated trustless persistent store is responsible for getting the data validated and agreed upon before committing locally.

23 Claims, 7 Drawing Sheets

(56) References Cited

U.S. PATENT DOCUMENTS

| | | | |
|---|---|---|---|
| 8,155,322 | B2 | 4/2012 | Bellare et al. |
| 8,429,757 | B1 | 4/2013 | Cavage et al. |
| 8,806,595 | B2 | 8/2014 | Nimashakavi et al. |
| 2002/0184535 | A1 | 12/2002 | Moaven et al. |
| 2004/0019807 | A1 | 1/2004 | Freund |
| 2005/0114650 | A1 | 5/2005 | Rockwood et al. |
| 2005/0114674 | A1 | 5/2005 | Carley |
| 2007/0256133 | A1 | 11/2007 | Garbow et al. |
| 2009/0187966 | A1 | 7/2009 | Carley |
| 2010/0313246 | A1 | 12/2010 | Irvine et al. |
| 2011/0179470 | A1 | 7/2011 | Carley |
| 2013/0013931 | A1 | 1/2013 | O—Hare et al. |
| 2013/0318347 | A1 | 11/2013 | Moffat |
| 2015/0095219 | A1 | 4/2015 | Hurley |
| 2017/0085555 | A1 | 3/2017 | Bisikalo et al. |
| 2017/0257325 | A1 | 9/2017 | Chauval et al. |
| 2017/0293669 | A1 | 10/2017 | Madhavan |
| 2017/0295023 | A1 | 10/2017 | Madhavan et al. |
| 2017/0301033 | A1 | 10/2017 | Brown |
| 2017/0352012 | A1* | 12/2017 | Hearn ............... G06Q 20/3829 |
| 2018/0253702 | A1* | 9/2018 | Dowding ............ H04L 9/3242 |
| 2018/0316507 | A1 | 11/2018 | Smith |
| 2019/0116174 | A1 | 4/2019 | Gray |
| 2019/0333033 | A1* | 10/2019 | Finlow-Bates .... G06Q 20/3829 |

OTHER PUBLICATIONS

"Ethereum", Wikipedia, 7 pages, downloaded Jun. 2, 2016, https://en.wikipedia.org/wiki/Ethereum.

Anonymous, "Overview of TimesTen Replication", Retrieved from the Internet: https://web.archive.org/web/, Aug. 14, 201660814233555/https://docs.oracle.com, Aug. 14, 2016.

Digitial Asset's proposed code contribution to the Linux Foundation's Hyperledger Project written in Java and Scala, Digital Asset, 5 pages, retrieved on Mar. 31, 2016, https://github.com/DigitalAssetCom/hlp-candidate.

Ethereum Project, Ethereum, 12 pages, downloaded Jun. 2, 2016, https://www.ethereum.org/.

Extended European Search Report, from EP Application No. 17169103.3, dated Jul. 11, 2017, EP.

Extended European Search Report, from EP Application No. 19208987.8, dated Mar. 20, 2020, EP.

Gendal, "Introducing R3 Corda™: A Distributed Ledger Designed for Financial Services", Apr. 5, 2016, https://gendal.me/2016/04/05/introducing-r3-corda-a-distributed-ledger-designed-for-financial-services/.

George Howard, "Imogen Heap Gets Specific About Mycelia: A FairTrade Music Business Inspired by Blockchain", Forbes, Jul. 28, 2015, 12 pages.

George Howard, "Imogen Heap's Mycelia: An Artists' Approach for a Fair Trade Music Business, Inspired by Blockchain", Forbes, Jul. 17, 2015, 19 pages.

Hyperledger Project, 2 pages, retrieved Mar. 31, 2016, https://github.com/hyperledger/hyperledger.

McLean et al., "Demystifying Blockchain and Distributed Ledger Technology—Hype or Hero?", Morrison & Foerster, Apr. 5, 2016, 8 pages.

Michael Nielsen, How the Bitcoin Protocol Actually Works, Dec. 6, 2013.

Non-Final office action, from U.S. Appl. No. 15/166,829, dated Aug. 9, 2018.

Open Blockchain Whitepaper, 10 pages, retrieved Mar. 31, 2016, https://github.com/openblockchain/obc-docs/blob/master/whitepaper.md.

Satoshi Nakamoto, Bitcoin: A Peer to Peer Electronic Cash System, Jan. 13, 2009.

The Periodic Table of Elements, The Elements Project, 1 page, retrieved Mar. 31, 2016, https://www.elementsproject.org/elements/.

The World's Fastest and Most Secure Payment System, Ripple, 4 pages, retrieved Mar. 31, 2016, https://github.com/ripple/rippled.

* cited by examiner

SELECTIVELY REPLICATED TRUSTLESS PERSISTENT STORE

REFERENCE TO RELATED APPLICATIONS

This application is a continuation under 37 C.F.R. 1.53(b) of U.S. patent application Ser. No. 16/196,257 filed Nov. 20, 2018, now U.S. Pat. No. 11,023,490, which is hereby incorporated by reference in its entirety and relied upon.

BACKGROUND

Various electronic mechanisms are used for storing data which multiple parties need to access, modify and/or maintain, including electronic ledgers and database managements systems.

A ledger may be a collection of entries (obligations, assertions, debts, credits, etc.) in a notebook or other physical or electronic form and are akin to a transaction log whereby the current "state" of a ledger may be ascertained by netting or otherwise totaling all of the entries up to the current time period. For example, "Party A loans $X to Party B" could be an entry representative of a transaction in a ledger. "Party B repays $X to Party A" may be a subsequent entry of another transaction in that ledger. The net result of these two entries is the extinguishing of the debt of B to A. Ledgers typically utilize double-entry book keeping whereby separate ledger entries, or separate ledgers, are maintained for each side (account/party) to a transaction and transactions are recorded as a pair of opposing transactions, e.g. credits vs. debits, to each respective account/party, either in the same ledger or in separate ledgers, each maintained by the respective party.

Ledgers may be held by individual parties, or ledgers may contain entries for multiple parties and be replicated/distributed amongst a variety of sources. A ledger which comprises many distributed copies may be referred to as a replicated ledger.

A database is a structured collection of information or content, typically held in a computer, e.g. stored in a memory or other storage device that can be readily accessed, managed and updated, for storing the current value or net/cumulative result of a series of transactions. As used herein, a database refers not only to the underlying data structure(s) which are used to actually contain data but also the mechanisms coupled therewith to enable access, management, updating, etc. Together, this may also be referred to as a database management system ("DBMS"). As opposed to a ledger which records a sequence of transactions, a database typically records only the net result of those transactions. While the transactions recorded in ledgers are periodically netted to determine a current state, databases reflect the current state of data as soon as a transaction has been "committed," i.e., the record in the database has been updated in manner considered to be permanent, e.g. visible to all users of that database.

The era of distributed database management systems (DDBMS) ushered in a multi node persistent stores that may be queried as one. One problem that DDBMS intended to solve was limited to either achieving horizontal scalability using commodity hardware or bringing the data closer to the compute node via replication. Some DDBMS like Hadoop and NoSQL have further attempted to distinguish themselves by eliminating the concepts of relational calculus and moving to schema-less structures and direct integration with languages like Java, C++ for queries. The need for central trust model was not mitigated until the concept of Blockchain emerged along with Bitcoin. Blockchain solved the problem that DDBMS intended to solve (scalability and reliability) along with making the store trustless and accessible to all.

Generally, a block chain, or blockchain, is a distributed ledger that maintains a continuously-growing list of data records, typically hardened against tampering and revision. A blockchain consists of data structure blocks which, in some implementations, hold exclusively data and both data and programs in other implementations, wherein each block stores batches of individual transactions and the results of any blockchain executables. Each block typically further contains a timestamp and information, e.g. hash and signature, linking the block to a previous block. Effectively, blockchain is an electronic public replicated ledger in which transactions, such as those involving the cryptographic currency bitcoin, are recorded. Each of the replicated blockchains communicates with the others via a network, such as the Internet. The Bitcoin blockchain operates completely transparently, so all data is transmitted to, and is readable by, all participants in the bitcoin system. That is, each party in the bitcoin system, with some exceptions, maintains a copy of the ledger, in which copies of all transactions are recorded, referred to as "full replication." In the case of bitcoin, this replicated ledger makes all transactions "open transactions" and viewable by all participants on the blockchain network which is a necessary property required to prevent double spending of bitcoins, i.e., parties attempting to send the same bitcoin to multiple parties. This property of visibility of all transactions in the bitcoin network is also a drawback of a blockchain, because it does not allow for the confidentiality of transactions. Every participant in the bitcoin network has access to every transaction on the blockchain. This facilitates the ability to track digital assets, e.g. bitcoins. While the integrity of transactions recorded in each ledger is cryptographically protected, i.e. "signed," via a transacting party's privately held cryptographic key, if someone were to steal a blockchain/bitcoin user's private key, the thief would have all of the information necessary, e.g. the transactional record and the cryptographic key thereto, to be able to see all of the transactions to which the user is a party, and the thief would be able to create transactions using the private key without the consent of the true owner of the private key.

Using the replicated ledgers of blockchain along with cryptographically linking/chaining the transactions stored therein enable all users to ensure the reliability of the transaction data, i.e. that transactions are recorded accurately and subsequent thereto, protected from fraudulent activity, as each user has a copy of all of the transactions and any unintended alterations to a transaction, e.g. via errors or fraudulent activity, are readily detectable via both the cryptographic discrepancies within the chained transactions that would be created as well as the discrepancies that such alterations will create among the various copies of the blockchain ledger.

To this end—Blockchain has been hailed as a practical DLT (Distributed Ledger Technology). DLT however is not a current state store. To arrive at a current state, the DLT transactions have to be applied successively. For example, in the case of a cryptocurrency like bitcoin, a wallet application is required to determine and hold the current state information.

Relational database management systems (RDBMS) have been used as current state stores. RDBMS store data in a row-based table structure that connects related data elements and includes functions that maintain the security, accuracy, integrity and consistency of the data. For a RDBMS, the information is organized in a structured manner, i.e. using a particular format, protocol or structure for organizing and storing the data therein, and the information may be accessed, or edited via transactions, i.e. single database operations, according to a particular set of principles. In mission critical implementations where the reliability of the data stored in a database is desirable, databases may be implemented in accordance with certain properties which guarantee the reliable processing of transactions. The properties may include atomicity, consistency, isolation, and durability, commonly referred to as "ACID". Adherence to these properties by a DBMS/RDBMS helps to guarantee that database transactions are processed reliably.

Atomicity requires that each transaction be "all or nothing": if one part of the transaction fails, then the entire transaction fails, and the database state is left unchanged. An atomic system must guarantee atomicity in each and every situation, including power failures, errors, and crashes. To the outside world, a committed, i.e. completed, transaction appears (by its effects on the database) to be indivisible ("atomic"), and an aborted transaction does not happen.

The consistency property ensures that any transaction will bring the database from one valid state to another. Any data written to the database must be valid according to all defined rules, including constraints, cascades, triggers, and any combination thereof. This does not guarantee correctness of the transaction in all ways the application programmer might have wanted (that is the responsibility of application-level code) but merely that any programming errors cannot result in the violation of any defined rules.

The isolation property ensures that the concurrent execution of transactions results in a system state that would be obtained if transactions were executed serially, i.e., one after the other. Providing isolation is the main goal of concurrency control. Depending on the concurrency control method (i.e., using strict, as opposed to relaxed, serializability), the effects of an incomplete transaction might not even be visible to another transaction.

The durability property ensures that once a transaction has been committed, it will remain so, even in the event of power loss, crashes, or errors. In a RDBMS, for instance, once a group of SQL statements execute, the results need to be stored permanently (even if the database crashes immediately thereafter). To defend against power loss, transactions (or their effects) may be recorded in a non-volatile memory.

However, the ACID approach to database management has drawbacks. For example, most implementations of the ACID approach require that data/records in the database be locked while that data is being interacted with, e.g. modified. This may effectively serialize access to data by multiple requestors and impede any operations which are dependent thereon.

Many business applications rely upon centralized databases/DBMS's, i.e. a database under the control of single or central entity, which, because they do not feature the replicated structure of blockchain or the cryptographic chaining of transactions, are typically implemented as a System of Record. A system of record (SOR) or Source System of Record (SSoR) is data management term for an information storage system, e.g. a computer implemented database/DBMS that is designated as the authoritative data source for a given data element or piece of information. Accordingly, while other entities may maintain copies of the data stored by an SOR, in the event of dispute between the value of particular data as stored in the SOR and as stored in a copy, the value stored by the SOR will be considered the true value. The need to identify systems of record can become acute in organizations where management information systems have been built by taking output data from multiple source systems, re-processing this data, and then re-presenting the result for a new business use. In these cases, multiple information systems may disagree about the same piece of information. These disagreements may stem from semantic differences, differences in opinion, use of different sources, differences in the timing of the extraction, transformation, and loading operations that create the data they report against, or may simply be the result of bugs. The integrity and validity of any data set is open to question when there is no traceable connection to a good source, such as a known System of Record. Where the integrity of the data is vital, if there is an agreed system of record, the data element must either be linked to, or extracted directly from it. Generally, a "system of record" approach may be used where there is a single authority over all data consumers, and those consumers have similar needs.

Generally, a system of record ("SOR") model is used for recording business related data such as transactions and agreements. In a SOR model, a trusted party holds and exclusively controls records of transactions in a centralized database. Individuals or other entities place their trust in the institution that hosts/controls the SOR, or otherwise agree that the SOR is the authoritative data source. Government and government agencies, financial institutions and even private/public companies may host/control the data and the SOR. For example, banks, 401k providers, utility companies, and many of the service agencies that people or business entities transact with are the SOR for that individual's or business entity's transaction records, e.g. account balance and/or transaction history with that service or agency. In the event of a dispute as to whether data in the SOR is correct as compared to another copy of that data which may differ, the institution that holds the SOR is typically deemed to have the correct data unless there is evidence to the contrary. Alternatively, when both parties are large institutions and neither institution is the SOR (e.g. two major financial institutions, such as two banks), messages are exchanged for every transaction and at the end of a period of time, e.g. at the end of the business day, a reconciliation process is undertaken by which each party validates their mutual understanding of each transaction which "seals" the transactions and, e.g. any end of day account balance resulting therefrom. In the event of a dispute, such as due to a bug, lost message or tampering, the parties must undertake a resolution process to determine the correct results, e.g. by reviewing network communication logs and/or transactional timestamps to determine the order of events. The SOR model, and the reconciliation process, referred to as a "trust and reconciliation" process, are commonly used in the implementation of electronic financial instrument trading systems.

Financial instrument trading systems are one example of complex systems that utilize databases according to an SOR model. Generally, a financial instrument trading system, such as a futures exchange, referred to herein also as an "Exchange", such as the Chicago Mercantile Exchange Inc. (CME), provides a contract market where financial instruments, for example futures, options on futures and spread contracts, are traded among market participants, e.g. traders, brokers, etc. Futures is a term used to designate all contracts for the purchase or sale of financial instruments or physical commodities for future delivery or cash settlement, and which are traded on a commodity futures exchange. A futures contract is a standardized legally binding agreement to buy (long) or sell (short) a commodity or financial instrument at a specified price at a predetermined future time. An option is the right, but not the obligation, to sell (put) or buy (call) the underlying instrument (for example, a futures contract) at a specified price within a specified time. The commodity or instrument to be delivered in fulfillment of the contract, or alternatively the commodity, instrument or reference for which the cash market price shall determine the final settlement price of the futures contract, is known as the contract's "underlying" reference, instrument or commodity, also referred to as the "underlier." The terms and conditions of each futures contract are standardized as to the specification of the contract's underlier, the quality and quantity of such underlier, delivery date, and means of contract settlement, i.e. physical delivery or cash settlement. Cash Settlement is a method of settling a futures contract whereby the parties effect final settlement when the contract expires by paying/receiving the pecuniary loss/gain of the contract, e.g. by comparing the contract price to the market price or other reference price of the underlier at the time of settlement, related to the contract in cash, rather than by effecting physical delivery, i.e. the actual exchange of the underlying reference or commodity at a price determined by the futures contract.

Typically, the Exchange provides for centralized "clearing" by which all trades are confirmed and matched, and open positions are settled each day until expired (such as in the case of an option), offset or delivered. Matching, which is a function typically performed by the Exchange, is a process, for a given order which specifies a desire to buy or sell a quantity of a particular instrument at a particular price, of seeking/identifying one or more wholly or partially, with respect to quantity, satisfying counter orders thereto, e.g. a sell counter to an order to buy, or vice versa, for the same instrument at the same, or sometimes better, price (but not necessarily the same quantity), which are then paired for execution to complete a trade between the respective market participants (via the Exchange) and at least partially satisfy the desired quantity of one or both of the order and/or the counter order, with any residual unsatisfied quantity left to await another suitable counter order, referred to as "resting."

A "Clearing House," which is typically an adjunct to the Exchange and may be an operating division thereof, is responsible for settling trading accounts, clearing trades, collecting and maintaining performance bond funds, regulating delivery, and reporting trading data to market regulators and to the market participants. An essential role of the clearing house is to mitigate credit risk via the clearing process. Clearing is the procedure through which the Clearing House becomes buyer to each seller of a futures contract, and seller to each buyer, also referred to as a "novation," and assumes responsibility for protecting buyers and sellers from financial loss due to breach of contract, by assuring performance on each contract. A clearing member is a firm qualified to clear trades through the Clearing House.

Current financial instrument trading systems allow traders to submit orders and receive confirmations, market data, and other information electronically via a communications network. These "electronic" marketplaces, implemented by, and also referred to as, "electronic trading systems," are an alternative trading forum to pit based trading systems whereby the traders, or their representatives, all physically stand in a designated location, i.e. a trading pit, and trade with each other via oral and visual/hand based communication.

In particular, electronic trading of financial instruments, such as futures contracts, is conducted by market participants sending orders, such as to buy or sell one or more futures contracts, in electronic form to the Exchange. These electronically submitted orders to buy and sell are then matched, if possible, by the Exchange, i.e. by the Exchange's matching engine, to execute a trade. Outstanding (unmatched, wholly unsatisfied/unfilled or partially satisfied/filled) orders are maintained in one or more data structures or databases referred to as "order books," such orders being referred to as "resting," and made visible, i.e., their availability for trading is advertised, to the market participants through electronic notifications/broadcasts, referred to as market data feeds. An order book is typically maintained for each product, e.g. instrument, traded on the electronic trading system and generally defines or otherwise represents the state of the market for that product, i.e. the current prices at which the market participants are willing buy or sell that product. As such, as used herein, an order book for a product may also be referred to as a market for that product.

In a futures exchange both trading and clearing may operate under a Central Counter Party ("CCP") model, where the futures exchange functions as a counter party to each trade and to the clearing of each trade, referred to above as a novation. CCPs benefit both parties in a transaction because they bear most of the credit risk. In a scenario outside of a financial exchange, where two individuals deal with one another by themselves, the buyer bears the credit risk of the seller, and the seller bears the credit risk of the buyer. Conversely, when a CCP is used the credit risk that is held against both buyer and seller is coming from the CCP. One consequence of a CCP model is that all communication and transactions must flow through the CCP, i.e. the CCP is the SOR, and thus information and trading may only be as fast as the CCP may process it and transmit it out to the interested parties. Records are usually kept by the CCP in a database as the source of truth and communicated to other parties using messaging. The CCP's client, e.g. a clearing member, may further have its own database of at least a subset of these records and periodically, typically daily, may reconcile them with the CCP. Further, the customers of a clearing member may have their own database, necessitating similar reconciliation. This effectively serializes the distribution of data from the CCP to all interested parties and increases the latency thereof.

DETAILED DESCRIPTION

The disclosed embodiments relate to implementation of a selectively replicated trustless persistent store (SRTPS) that stores data of interest to, or otherwise shared among, multiple parties, and, in particular that uses content agnostic replication of data between permissioned parties. The SRTPS includes the properties of immutability, irrefutability, confidentiality, recoverability, atomicity, and durability. A bilateral distributed ledger (BDL) is used as a substrate of the SRTPS to replicate stored transactional data between parties. The BDL provides for replication and reconciliation of the transactional data by using bilaterally associated assertions among pairs of participants.

Figure 1:
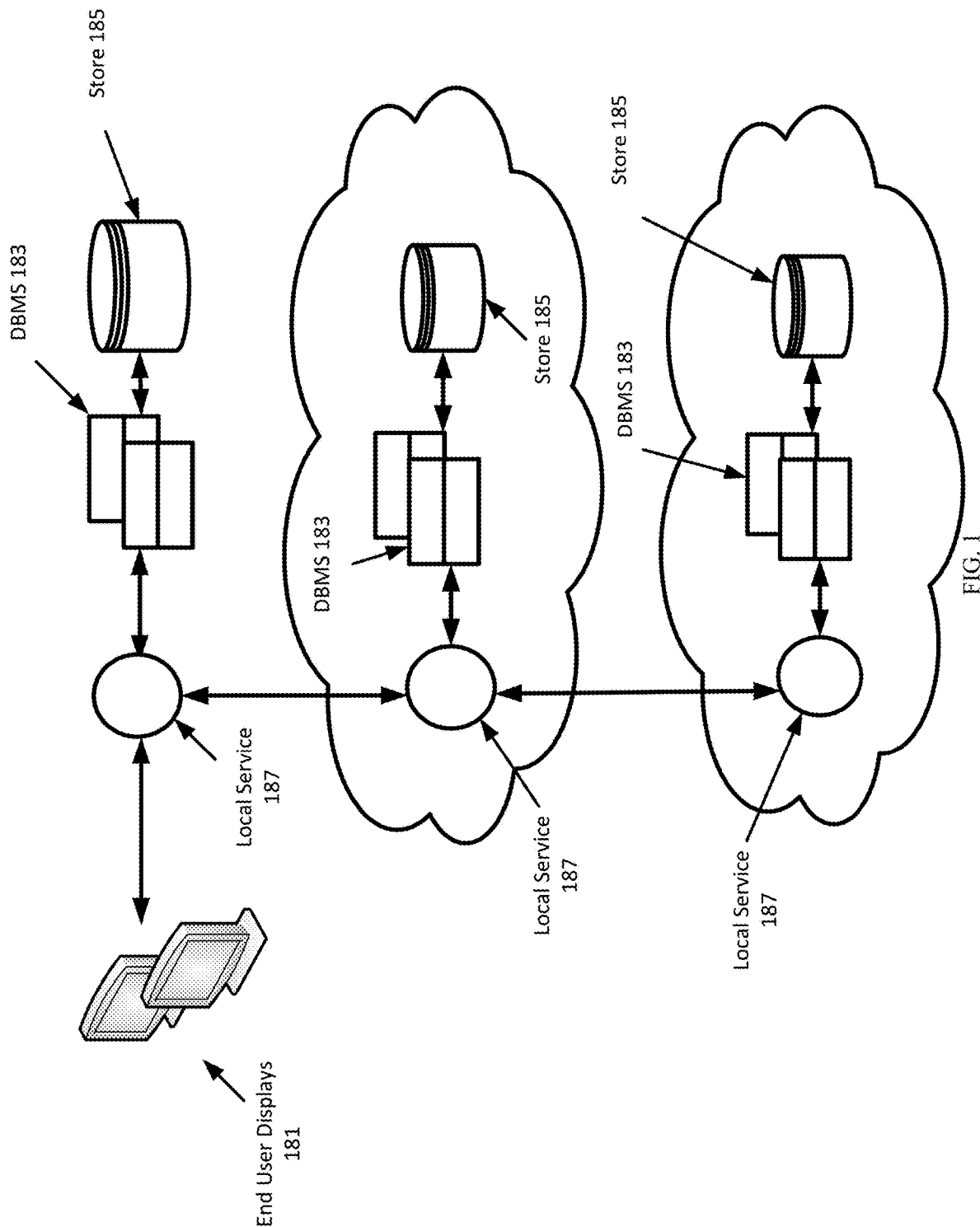
FIG. 1 depicts an example operation of an illustrative electronic database.

FIG. 1 depicts known methodologies for interacting with a shared data structure. In particular, FIG. 1 depicts example operation of an illustrative distributed database. FIG. 1 depicts local persistent stores 170, 172, 174 that are in control of the entity that hosts the data. If a persistent store 170, 172, 174 is intentionally or unintentionally altered in any way that is not consistent with the physical reality or book keeping, then the it would be significantly difficult to establish the original state. Recovery cannot be performed from counterparties or replicated stores unless there is a guarantee of data authenticity. An example in this case is an electronic bank balance. If the balance is altered in the central store without authorization—then rolling back transactions to tally with counterparties is a labor intensive manual effort. Physical receipts, network logs etc. may have to be used to re-baseline the data. If the data and consumers of the data are a part of the same organization of entity—this is not an issue. But the issue of trust will arise when the multi user system is segmented as service provider and customers. Loss of the central store also means that loss of data for the same reasons as above. Losing customer data would be disastrous for a service provider or a business entity. This is one of the main reasons why companies have distributed persistent stores or real-time backups.

Further, each inquiry into the current state of data requires a network access. Unless the client side user interface has a local cache that can be trusted independently of the central store, network access is unavoidable. If the service is located at a considerable distance (from a network latency standpoint) from the customer, the user experience can be affected. Generally, almost all of the internet based applications are multiuser applications that force the user to trust the service provider and depend on internet connectivity. Although internet is almost ubiquitous, simple non-mod requests take as long as mod requests since they are all handled by the same service. In other words—a query or a search is a remote request to the server.

There are solutions to these problems currently implemented. One solution is to allow the client to hold most of its query-able data and changes to data have to be channeled via the client only. Introducing a local cache solves the remote access across the network. Data is locally available for queries, but every write access has to be network call. Additionally—for this to work—the client has to be a thick client. The logic of accessing the local cache has be per client. Alternatively, an inline shared cache can be used for thin clients that could either cache: UI responses (web cache for instance), Service Request Responses (RPC cache), or Data (via custom messaging). The shared cache is dependent on what response the remote service end point is coded for. In almost all cases the remote service renders an HTTP UI response and the shared cache works as a web caching web proxy. In most other remaining cases the remote service is a synchronous RPC endpoint (REST, SOAP, RMI etc.) which makes the local cached service an RPC cache for reads. Both these caching strategies are non-invasive to the overall architecture. With REST over HTTP or SOAP being predominantly used for Internet RPC now, any HTTP caching service works. In a small number of cases—financial institutions, health care industries etc. use asynchronous messaging predominantly for request/response to affect a remote store and keep the local store in sync. The strategy is highly invasive in terms of architecture and business bespoke since the caching service is content aware. Read requests are directed to the local store in the form of queries but mod requests are submitted as an asynchronous request to the remote service. The UI and local stores have to be coded to accommodate asynchronous responses. Further, this method still does not address the issue of trust in the central store and the single point of failure. This solution also introduces other problems of code complexity and issues of stale shared data in the cache. Furthermore—the architecture or effort is not reduced, only the performance is improved.

In an embodiment, an SRTPS instance, using a BDL, is provided for synchronizing current state data stores shared among the multiple parties rather than having to rely on custom (content/business aware) messaging or RPC mechanisms to sync the data. Data modifications may be made in any shared store locally and then are automatically replicated across other permissioned stores. SRTPS is responsible for getting the data validated and agreed upon before committing locally. The network communication layer is thus hidden. Communication terminates at a local store as if it is a non-distributed system.

Figure 2:
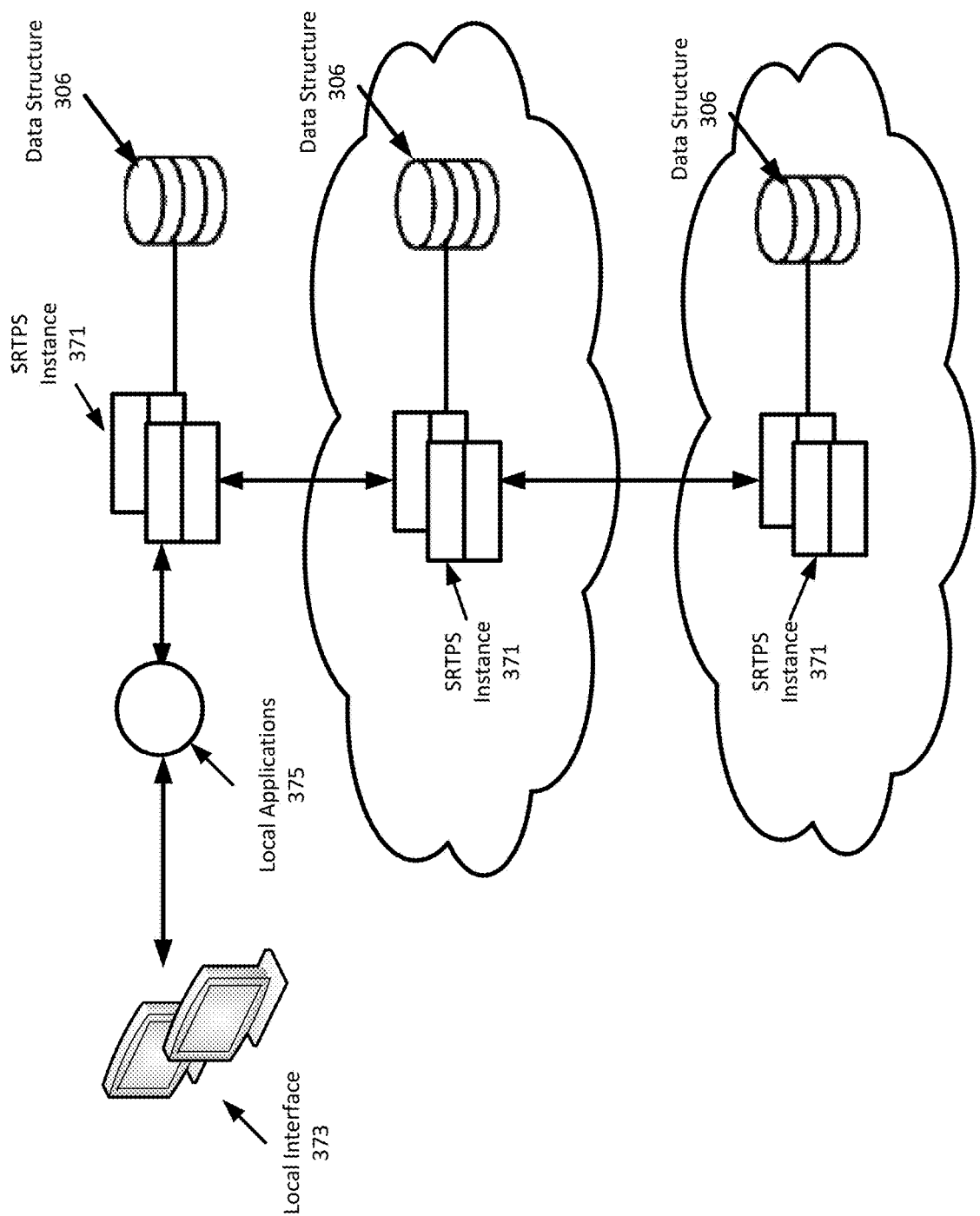
FIG. 2 depicts an example system which implements a SRTPS according to one embodiment.

FIG. 2 depicts an example of an implementation of SRTPS instances that store data of interest to, or otherwise shared among, multiple parties, and, in particular that provides automatic replication of data between permissioned parties. In FIG. 2, a local interface 373 displays data to a user. A user(s) may enter or input data into the local interface 373. The local interface 373 communicates with local applications 375. The local applications 375 may operate autonomously or may take input from the local interfaces 373. The local applications 373 may also receive and process data over a network. The local applications 373 communicate with the SRTPS 371. The SRTPS 371 stores and replicates data structures 306 between remote instances using a BDL. The SRTPS 371 communicates and stores data in the data structure 306. Each SRTPS instance 371 may operate autonomously and may communicate with other SRTPS instances 371. For example, all SRTPS instances 371 may not communicate with one another. Each SRTPS instance may not share data with all of the other SRTPS instances 371 and as such does not need to replicate or communicate with all of the other instances. However, each SRTPS instance may be configured to accept communications from new SRTPS instances 371 by negotiating shared schemas between the instances.

Figure 3:
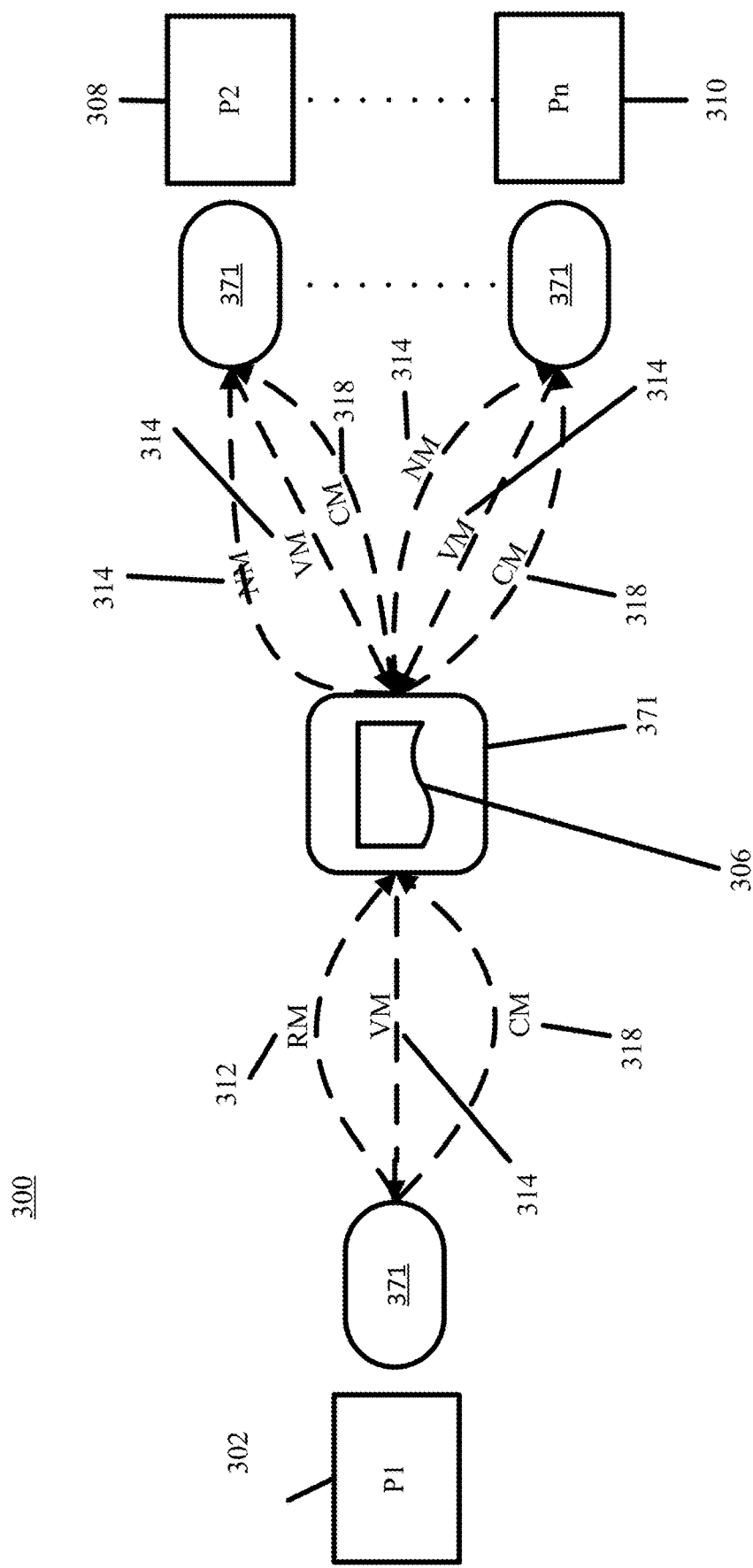
FIG. 3 depicts an example operation of a system which implements a SRTPS according to one embodiment.

FIG. 3 depicts example operation of an illustrative system 300 which implements the disclosed SRTPS for interacting with a shared data structure 306 according to one embodiment. FIG. 3 includes example participants 302, 308, and 310. The system 300 may utilize any number of participants 302, 308, 310 from P1 . . . Pn. A participant 302, 308, 310 may interact with the system 300 in one or more of a variety of roles, including, but not limited to: as a party to a transaction (a proposer of the transaction, an asserter of fact or agreement, an issuer of a credential, authorization, license, certification/certificate, or accreditation etc.); as a counterparty to a transaction; as a witness to a transaction; and/or as a watcher to a transaction. It will be appreciated that not all of these roles may be implemented, and/or additional and/or alternative roles may be implemented.

Each participant 302, 308, 310, may use different applications to interact with a local SRTPS 371.

A party to a transaction may be a participant who proposes a transaction or otherwise makes an assertion to another participant, which would be referred to as a counter party. A witness is one who receives a copy of a transaction, i.e. "listens," and attests, e.g. cryptographically signs and validates, that they saw, i.e. received and comprehended, a transaction between the party and the counter party participants. Witness participants may serve a notarial or regulatory role. While a witness may not know the nature of the transaction or assertion, e.g. due to encryption thereof, as will be described, they are aware that that the transaction or assertion exists, via the receipt of a copy thereof, and they are aware of the party and counter party participants and can attest to, e.g. confirm/validate, the existence of the transaction and parties thereto. For example, with respect to a transaction between two participants in which the first party undertakes an obligation to the second party, the witness participant may be able to attest to the existence of the transaction and that the parties thereto, but, due to encryption, the witness may not know of the details of the obligation. A watcher is a participant that listens to, i.e. receives a copy of, and, and may record, i.e. store a copy of, a transaction, but does not attest to it, i.e. does not provide confirmation or validation. A watcher participant may serve a notarial or regulatory role or merely provide transactional integrity against improper behavior, such as where a catastrophic failure compromises the data structures of multiple participants or otherwise results in only one participant having the ability to reconstruct lost transactions and that participant knowingly or unintentionally fails to provide complete or accurate data. Parties, counterparties, and/or witnesses to transactions may all be required to validate transactions for the transactions to be complete as will be described. Watchers to transactions may be made aware of transactions, i.e. receive copies, but may not validate the transactions like parties, counterparties, and witness. Conversely, participants 302, 308, 310 in the system 300 that are not involved in a transaction would not be made aware of that transaction.

The system 300 shown in FIG. 3 includes an instance of a SRTPS 371 in which data is stored in a relational database structure 306. The SRTPS instances 371 of participants 302, 308, 310 interact using a bilateral distributed ledger (BDL) as was described, such as the message format and/or protocols described in and U.S. Patent Publication No. 2017/0293669A1 which is incorporated by reference herein in its entirety and relied upon. Exemplary data transaction messages in the BDL include request data transaction messages 312, notification data transaction messages 314, validation data transaction messages 316 and response data transaction messages 318. The messages 312, 314, 316, and 318 are formatted using the schema that is agreed upon by the SRTPS instances 371. The request data transaction messages 312 may include data indicative of one or more changes to the data structure 306 of the SRTPS 371. The changes may relate to proposals, such as a proposal of an agreement or other proposition or assertion of an opinion, or an assertion, such as an assertion of fact, e.g. an assertion of the existence of an agreement, an authorization, a license, a certification, an accreditation, a statement of intention, e.g. an intention to create, modify or remove data, an assertion of a revocation of an agreement, authorization, license, certification or accreditation, etc.

Once a data change to the data structure 306, is made and validated, as described, it may form a logically/effectively permanent unalterable record, i.e. as viewed by the parties, users of the system. Accordingly, to effect a change, a subsequent data change, once validated, may act to supersede or modify a previous validated data change, such as by acting as a revocation to revoke the prior data change, an addendum to add additional parameter, an amendment to alter terms and/or, a novation to alter the parties to a prior data change, etc. As can be seen then, and as discussed in more detail below, as the original change remains unaltered, to understand the present state/understanding of that data change, it may need to be viewed in the context of, e.g. netted with, any subsequent data changes.

Generally, a request data transaction message 312 may comprise data indicative of a request to store new data or make a change to the relational data structure 304 in communication with the SRTPS instance 371. A notification data transaction message 314 includes data indicative that a request data transaction message has been received by the system 300 and includes data indicative of that received request and may further include a request to the recipient to validate the received request or other indication that the recipient is to validate the requested change to the data structure 320. Notification data transaction messages 314 may be automatically generated and transmitted upon receipt of a request data transaction message 312. A validation data transaction message 316 comprises data indicative of a participant's validation of a requested change to the data structure 320, e.g. a response to a request to validate a received request data transaction message, which may include data indicative of a confirmation or a rejection of the received request data transaction message. A response data transaction message 318 includes data indicative of the system's 300 response to a request data transaction message, e.g. based on the received validation data transaction messages, e.g. that the requested transaction was performed or not. Response data transaction messages 318 may be communicated, as will be described, to all participants participating in the transaction so as to convey the result thereof.

All of the data transaction messages discussed above may be received asynchronously and trigger the actions listed below. In other words, while one request is processing, another request may come in, and notifications and validations may be received, etc. Data is stored in the data structure organized by linked tables as described below. The incoming data transaction messages may also be stored in a cache or buffer until validated. For example, a data change message may be transmitted to multiple participants. Until validation is received from all of the participants, the contents of the data changes are not implemented in the data store. Due to lag or latency, there may be a period of time when the data change is waiting to be implemented. In such a scenario, the record may be flagged as awaiting a change. If, there are multiple conflicting changes to a data record in the data store, a first in first out strategy may be implemented to process the changes. The initial change request may be processed while other later change requests may be implemented only if the changes are possible. If a data change is rejected, it may be resent or repackaged by the SRTPS instance 371 that initialized the change in order to comply with the exiting conditions.

The collective contents of a possible data change may reflect the state of the transaction represented by those contents. For example, if an entry contains the proposed assertion only, and no validations, the state of that assertion is "proposed" or "incomplete." As the requisite validations, witness attestations, etc. are received and data indicative thereof stored into the entry, the state of the entry changes, e.g. to "in process," until all requisite validations, witness attestations, confirmations, etc., are stored in the entry, upon which the state of the entry may be considered to be "validated" or "complete." Data indicative of a "validated", "attested to" or "confirmed" state may be stored in the entry and updated as new data is stored into the entry or, alternatively, the state may be determined by reviewing which of the requisite data is stored in the entry and which of the requisite data is still outstanding, i.e., not yet received. The described data transaction request messages may then operate with respect to particular entries, i.e. creating new records or augmenting existing records as described. It will be appreciated that other organizations may be used, either more or less granular.

Figure 4:
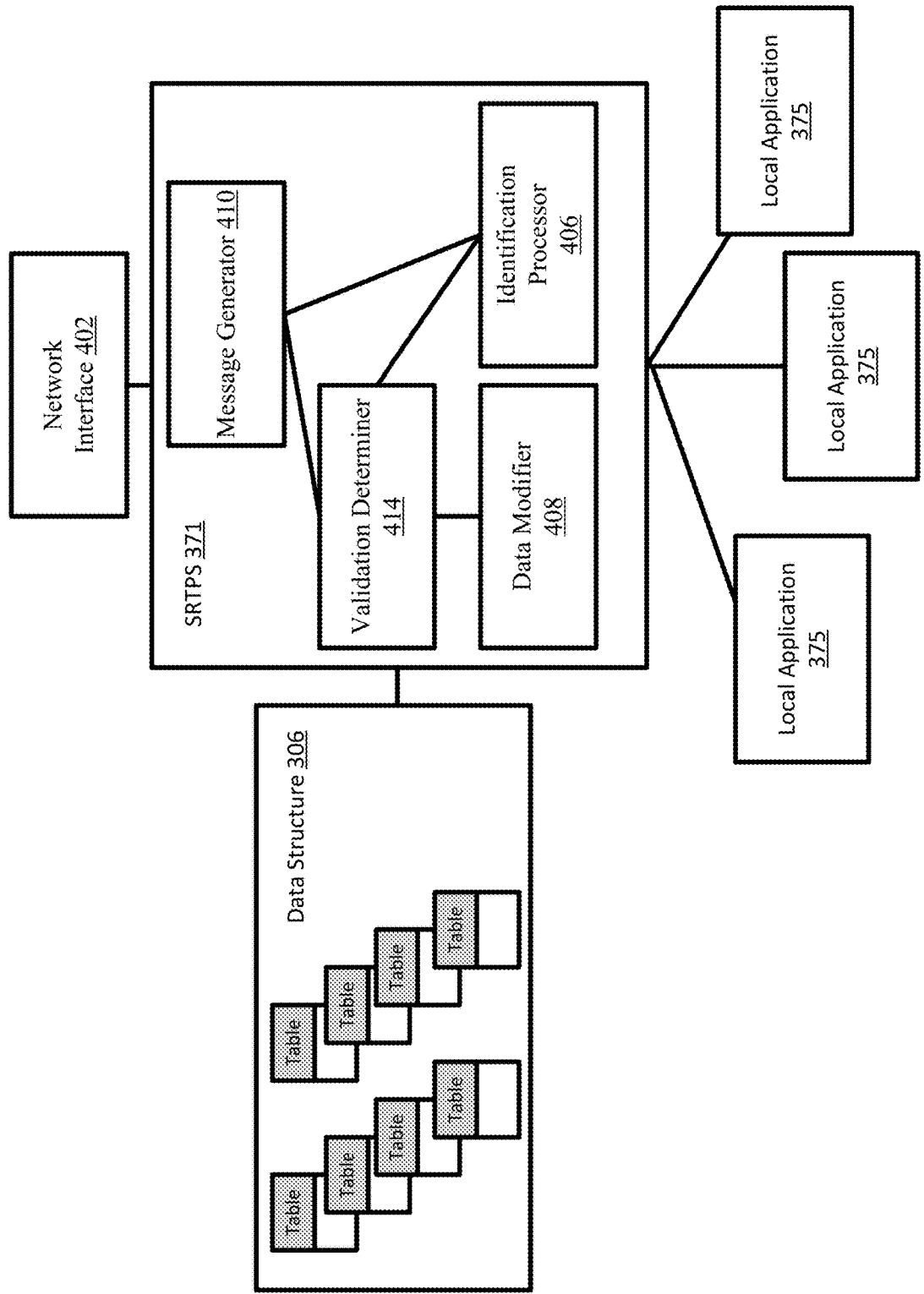
FIG. 4 depicts a block diagram of a SRTPS.
Figure 5:
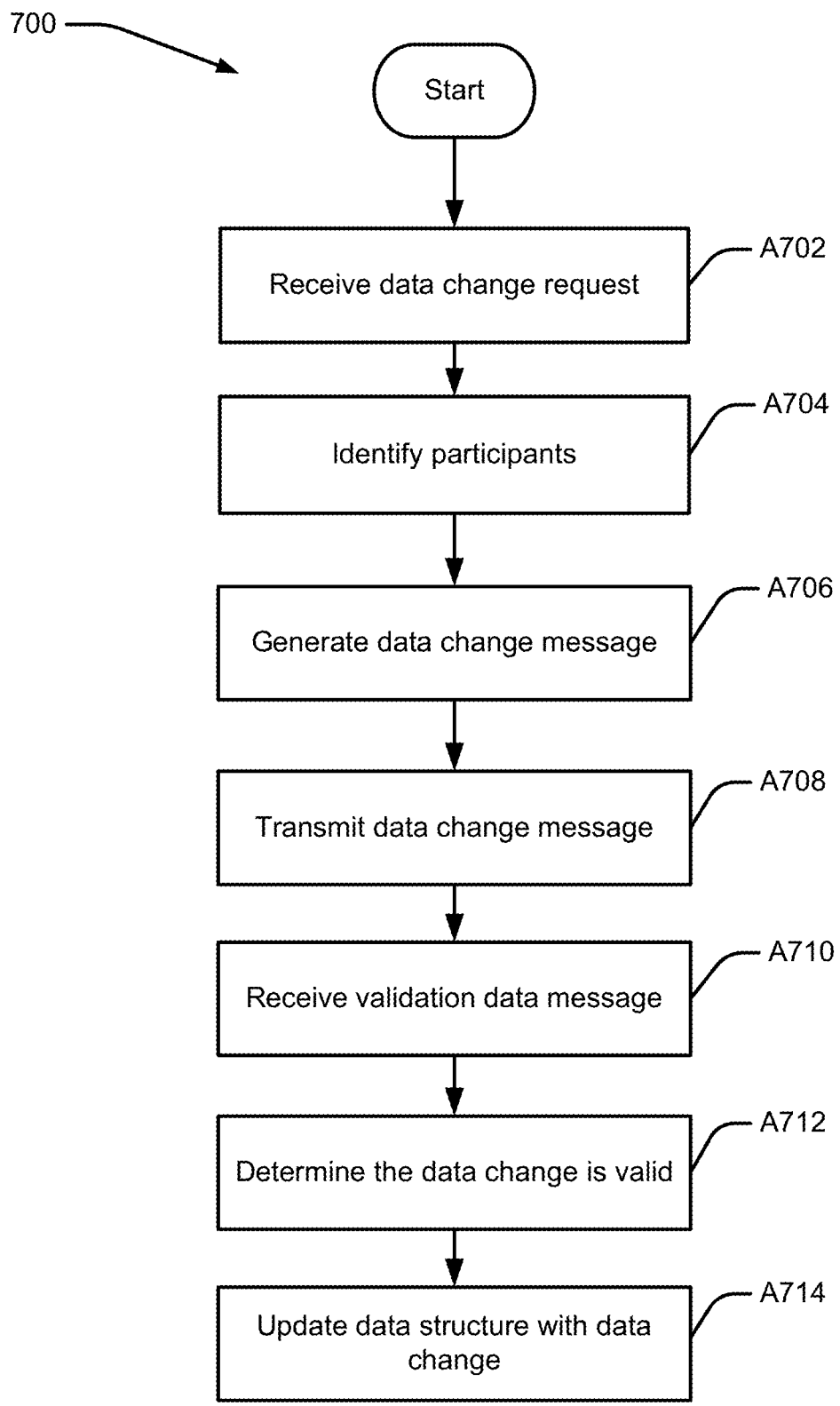
FIG. 5 depicts a flow chart showing operation of the system of FIGS. 2-4 according to one embodiment.
Figure 7:
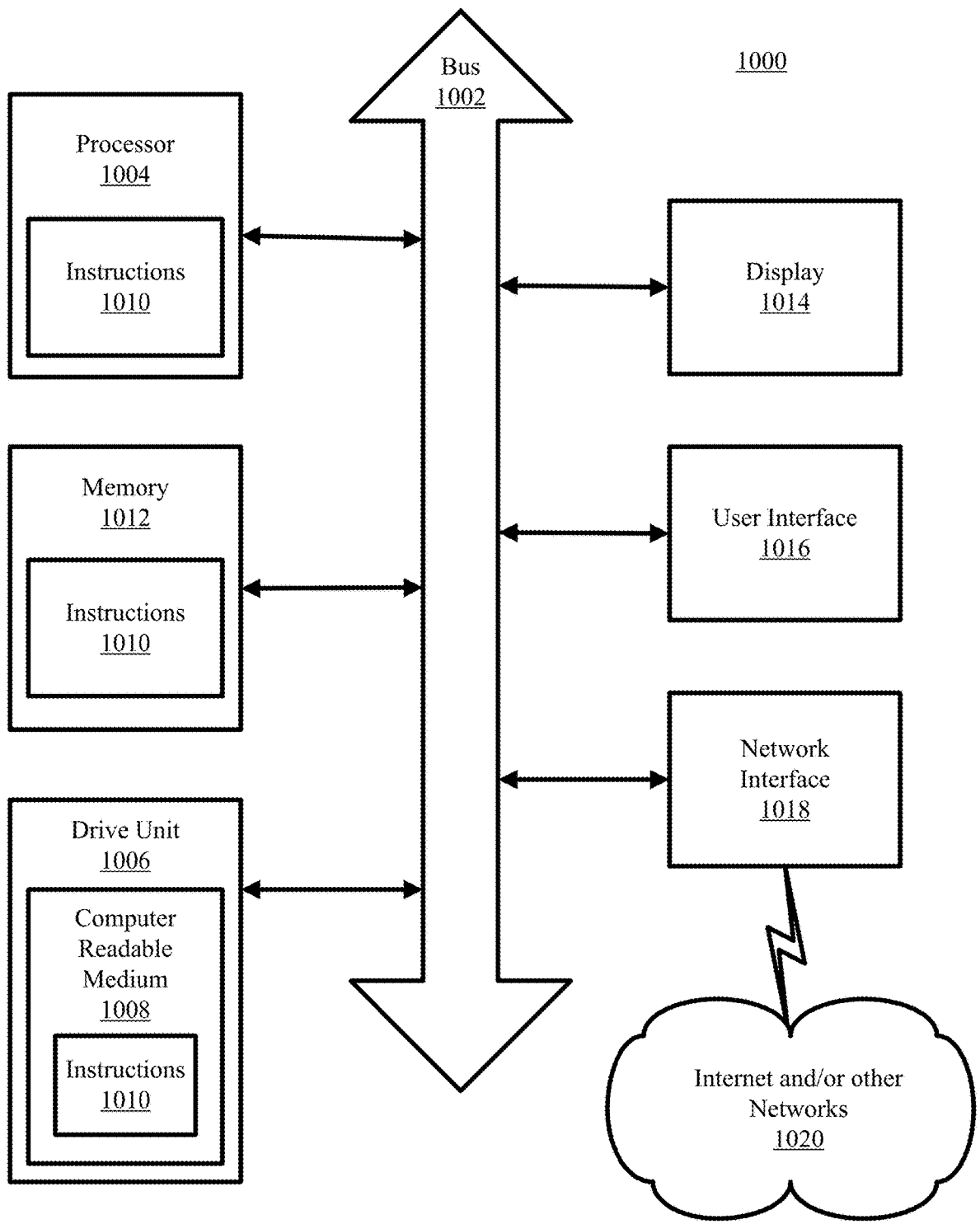
FIG. 7 shows an illustrative embodiment of a general computer system for use with the systems of FIGS. 2-4.

FIG. 4 depicts a more detailed block diagram of an instance of SRTPS depicted in FIG. 3 according to one embodiment. FIG. 4 includes a network interface 402, a transaction receiver 404, an identification processor 406, a data modifier 408, a message generator 410, a validation determiner 414, and a data structure 306. FIG. 5 further depicts one or more local applications 375 that may access and operate on the data structure 306. The local applications 375 transmit changes through the SRTPS instance 371 which manages the state of the data structure 306. The network interface 402, which may comprise the network interface 1018 described below with respect to FIG. 7, is operative to couple the system 304 with a network, such as a public and/or private communication wired and/or wireless network, such as the network 1020 shown in FIG. 7 and described in more detail below, and facilitates communications among the SRTPS instances 371 as described herein.

The data structure 306, which may be implemented as a separate component or as one or more logic components, such as on an FPGA which may include a memory or reconfigurable component to store logic and processing component to execute the stored logic, may be configured as a relational database 306. The relational database 306 is a set of formally described tables from which data can be accessed or reassembled in many different ways without having to reorganize the database tables. The data structure 306 may be accessible by local applications 375 using, for example, an application programming interface (API) such as SQL. The local applications 375 communicate changes or additions to the data structure 306 using the SRTPS instance 371.

The identification processor 406, which may be implemented as a separate component or as one or more logic components, such as on an FPGA which may include a memory or reconfigurable component to store logic and processing component to execute the stored logic, or as second logic, e.g. computer program logic, stored in a memory, such as the memory 1012 shown in FIG. 7 and described in more detail below with respect thereto, or other non-transitory computer readable medium, and executable by a processor, such as the processor 1004 shown in FIG. 7 and described in more detail below with respect thereto, to cause the processor to, or otherwise be operative to, identify based on the request data transaction message, at least one other participant of the plurality of participants to validate modifications to the data.

The data modifier 408, which may be implemented as a separate component or as one or more logic components, such as on an FPGA which may include a memory or reconfigurable component to store logic and processing component to execute the stored logic, or as third logic, e.g. computer program logic, stored in a memory, such as the memory 1012 shown in FIG. 7 and described in more detail below with respect thereto, or other non-transitory computer readable medium, and executable by a processor, such as the processor 1004 shown in FIG. 7 and described in more detail below with respect thereto, to cause the processor to, or otherwise be operative to, modify the data stored in the memory in the shared data structure according to a request to modify the data. Similarly, the data modifier 408 may be operative to not modify data stored in the shared data structure or remove data stored in the shared data structure. The data modifier 408 may be further operative to, store, prior to the receiving of any validation data transaction messages, data indicative of a request to modify data stored in the shared data structure in a portion of the shared data structure accessible only to the first participant and the identified at least one other participant, and further storing, upon receipt of each validation data transaction message, data indicative thereof in the portion of the shared data structure, the modifying of the data stored in the memory in the shared data structure comprising storing data indicative of the confirmation in the portion of the shared data structure, and the modifying of the data stored in the memory in the shared data structure comprising storing data indicative of a rejection of the request to modify in the portion of the shared data structure.

The message generator 410, which may be implemented as a separate component or as one or more logic components, such as on an FPGA which may include a memory or reconfigurable component to store logic and processing component to execute the stored logic, or as fourth logic, e.g. computer program logic, stored in a memory, such as the memory 1012 shown in FIG. 7 and described in more detail below with respect thereto, or other non-transitory computer readable medium, and executable by a processor, such as the processor 1004 shown in FIG. 7 and described in more detail below with respect thereto, to cause the processor to, or otherwise be operative to, generate using a schema shared with the plurality of participants, a data change message from the data change request. The message generator 410, may be configured to automatically monitor the data structure and generate a message whenever a change is detected. In addition, or alternatively, the data structure may be configured to generate a change event message and transmit the change event message to the message generator 401 which then generates a request change message.

The validation determiner 414, which may be implemented as a separate component or as one or more logic components, such as on an FPGA which may include a memory or reconfigurable component to store logic and processing component to execute the stored logic, or as sixth logic, e.g. computer program logic, stored in a memory, such as the memory 1012 shown in FIG. 7 and described in more detail below with respect thereto, or other non-transitory computer readable medium, and executable by a processor, such as the processor 1004 shown in FIG. 7 and described in more detail below with respect thereto, to cause the processor to, or otherwise be operative to, determine based on the received validation data transaction messages, whether all of the identified other participants have validated the request to modify the data.

SRTPS interacts with the data structure 306. In an embodiment, SRTPS defines a schema and queries similar to the interactions of existing RDBMS. For example, SRTPS may use a schema that is similar to how a RDBMS conceives of declarative data structures and how they can be queried. The relational structure and schema provide for easy integration for existing applications and uses. SRTPS is configured to selectively share content and to inspect pending transactions. Inspection provides for integrating applications since there is a concept that goes beyond committed and uncommitted transactions. Changes to data may be proposed in an SRTPS but a truly committed state requires the validation and acceptance from all remote SRTPS instances that share the data.

SRTPS is further configured to automatically trigger an external logic routine in an event to the data structure. SRTPS is configured to allow for actions/validations etc. to happen when a remote data change is made. Validation logic may be used to accept changes to the data structure. When data is shared between two participants and one participant modifies the data the record, the modification won't be committed unless the other participant's validation is successful. This functionality serves as an asynchronous callback/notification mechanism and combines persistent/certified messaging with a structured current state store.

The schema, selective sharing and inspection, and automatic notification mechanism by the SRTPS fulfill the "SR" (e.g. selective replication) portion of SRTPS. To provide the "T" (trustless) part, the selectively replicated data should be incontrovertible once agreed upon. As a result, the source or originator of the data can lose their copy of the data but can recover from a counterparty without doubting that the dataset in its entirety has been altered in any way. Finally, the "PS" part of the SRTPS implies that once data is shared and agreed upon—the data cannot be altered or deleted without mutual (all parties) consenting to the change. Unlike a traditional DBMS, where persistence implies that the data outlives the process that created it, SRTPS persistence implies that data lives all the destruction of the media where the data was created.

To provide the "TPS" portion, the data must be selectively shared in a cryptographically secure manner such that once agreed upon, e.g. the data, agreement and its participants cannot be altered maliciously. The use of DLT such as used in Blockchain, as described above, is used to ensure the sanctity of persisted data. For example, a first instance A may selectively share data with other instances B,C,D. If A loses the data, the instance A will need to recover from all parties—B,C,D. Replicated data may be lost on transit but SRTPS guarantees that as long as the node that originated the data survives the loss—the data will be eventually replicated.

SRTPS creates a current state database that uses a trustless model to replicate transaction logs. SRTPS provides a structured store that may be used for replicating, sharing, and synchronizing data spread across multiple sites or multiple parties. SRTPS is ACID compliant, easy to scale, and easy to integrate into current systems. One use for SRTPS is in replicating and synchronizing transactions between multiple parties. Generally, all transactions in the following disclosed embodiments may be bilateral, or otherwise decomposed into component bilateral transactions, e.g. assertions, between two participants, referred to as a party and a counter-party. That is, for each data stored in the data structure, there are two interested participants having an interest in, or otherwise related to, that data, referred to as the party-participant and the counter-party participant.

Initially each SRTPS instance 371 starts out empty. Each SRTPS is then initialized with known current state and counterparties. The counterparties signoff on the current state which allows for changes to proceed. Each SRTPS instance 371 is configured to automatically trigger an external logic routine in an event of a change to the data structure. The external logic routine is used as the mechanism to replicate and sync the transactions between multiple parties, e.g. validation of change. A change in the data structure, for example, entering an order/assertion into an application connected to a local SRTPS, triggers the replication/syncing mechanism using a BDL. Validation logic provides that the change is acceptable and if it is—SRTPS signs the assertion and transmits the assertion back using the BDL. Upon receipt of the signed acceptance—the record is committed. The callback routine may also transmit messages, updates to other data stores, etc.

A party-participant's attempt, request or other indication of an intent to change data in the data structure, e.g. to add new data or modify existing data, is implicitly and automatically communicated to the other counter-party participant identified as being interested in that data, e.g. via a request, or other communication using a BDL reflecting an opportunity, to validate the change, to obtain the counter-party participant's validation, or otherwise cause them to validate, that the requested change is acceptable, e.g. according to that participant's own rules, such as may be dictated by business logic or business rules. The data being modified or added to the data structure is indicative of an assertion, such as an assertion of fact or truth, a proposed agreement, an authorization, license, certification, accreditation, etc., or other statement of an intention to create, modify, or remove data from the shared data structure.

Each party operates and communicates using a local version of the SRTPS. Each instance of the SRTPS is configured to receive, transmit, interpret, and validate communications from other SRTPS instances. Each communication is validated between the SRTPS of permissioned parties using the BDL. For example, communication of a participant's request or intention to change data in the data structure will cause, e.g. automatically, the counter party-participants to evaluate the change according to business logic or business rules, such as via the SRTPS instance 371 running at the counter party-participant, an external program, or external review process, to determine whether the change is acceptable/valid. The business logic/business rules may comprise automated and/or manually performed evaluation, calculation, and/or verification rules and/or processes which determine the acceptability of the requested change to the counter-party participant. In one embodiment, the business logic/business rules may be a simple approval of any change without any further analysis wherein the validation indicates merely that the counter-party has received and is aware of the modification. Alternatively, where the requested change relates to a calculated value, either mathematical or logical, the business rules/business logic may recalculate the value, using the same or a different calculation methodology, and compare the proposed value with the recalculated value to determine whether they are equivalent or not. The business logic/business rules may further define, where the proposed value differs from the recalculated value, an acceptable range by which those values may differ. A bilateral distributed ledger (BDL) allows for a counter proposal. So that feature in a BDL bubbles up to SRTPS as the ability for the counterparty to reject the changes and propose a modified change. Contrasted to an RDBMS with a local trigger—if the trigger fails—the data changes fail. Usually a human has to intervene In SRTPS—using a BDL—one can propose a change to the structured store—the change can be rejected by the counterparty (their validation logic). Their validation logic may be smart enough to correct the error and counterproposal. The business logic/business rules may be enshrined in the SRTPS by a schema that defines the structure of the RDBMS. By sharing and agreeing on the schema, the SRTPS instance 371 of one party may provide requested changes that are automatically validated by the SRTPS instance 371 of a counter party. Other business rules/business logic may validate an assertion of fact against an independent source for that fact to confirm the veracity of the assertion. Still other business rules/business logic may define subjective or objective thresholds, value ranges, or sets of values, such as for measures of risk, as a specification for when an assertion is valid or not. Business rules/business logic could also simply implement a process to confirm that the recipient received the request and/or that a user, such as an auditor, logged, reviewed or was otherwise made aware of the request.

If the SRTPS of the counter-party participant validates the intention of the party to change the data, e.g. responds to the validation request approving the requested change, e.g. acceding to the assertion of fact or agreeing to the proposed agreement, the data structure of the SRTPS is updated in accordance therewith as both parties, who are the only parties interested in that data, have approved the change. If the SRTPS of the counter-party participant responds to the validation request disapproving of the requested change, the data structure is not modified. The validation request, the validation response, and the determination of whether or not to apply the request change are processed by the SRTPS instance 371. The SRTPS instance 371 of the requesting party-participant is notified of the result, i.e. that the requested change was made or not, via a confirmation message. The SRTPS instance 371 may confirm or deny the veracity of the assertion relative to the counter-party, i.e. it is the counter-party's assertion as to whether it considers the party's assertion to be true or not, or otherwise acceptable. Accordingly, the validation, where approving the modification, may serve as a confirmation, agreement, authorization, license, certification, accreditations, etc., or in the case where the validation disapproves of the modification, it may serve to indicate that the party is wrong/mistaken, is lying, there is a disagreement, that the party is not authorized, not certified, not licensed or not accredited. It will be appreciated that the semantics of the validation depend upon the semantics of the assertion.

It will be appreciated that the counter-party participant's SRTPS need not receive any confirmation message as it is already aware that if it approved the change, the change will be made, and if it did not approve the change, the change will not be made.

In implementations using a shared data structure, each data record in the data structure of the SRTPS may include specific and unique permissions defining which instances may access data stored therein, e.g. defining which instances may be permitted to attempt or otherwise request a modification the data in that particular data record and which other instances have an "interest" therein and should be notified as described above, where the permissions may vary for each data record in the data structure. A shared data structure may thus be maintained by either instance, or maintained separate therefrom, in such a manner as to provide the requisite access to parties to attempt to make modifications and receive implicit communications related thereto, as described. Exemplary implementations are described herein. If, in one implementation, the party and the counter-party instance were each maintaining their own copy of the data, the counter-party may reliably update this copy based on its response, i.e. be assured that its copy reflects the same state as the copy of the data structure maintained by the party, and avoid any need to later reconcile this copy. In addition, each instance may store a dissimilar set of data. A first instance of SRTPS may interact with a first set of data and a second instance of SRTPS may interact with a second set of data. There may be overlap between the first set and the second set of data, in which case any changes to data that is stored at both locations need be replicated between the two instances. However, due to each instance storing dissimilar data, the data must be selectively shared. Certain data shared between a first instance and a second instance may not be shared with a third instance, even though the third instances shares some data with both the first instance and second instance. Assertions that are rejected or otherwise disapproved of by the counter-party participant are not stored or otherwise reflected in the data structure. Alternatively, the proposed assertion, along with data indicative of the rejection or disapproval by the counter-party participant, are stored in the shared data structure to, for example, provide a record thereof. As used herein, an approved request to change data in the data structure may be referred to as making the requested change "visible" whereas a disapproved/rejected change is not made visible, wherein visibility refers the logical interpretation of the data stored or not stored in the data structure along with any additional data indicative of the approval or disapproval thereof.

As was explained above, in an electronic trading system, a central counter party ("CCP"), subsequent to the matching of an offer to trade with a suitable counter offer thereto, e.g. during the clearing process, novates itself into each trade, e.g. becomes the counter party to each side of the trade, specifically, the CCP becomes the buyer to the selling trader, and the seller to the buying trader. Accordingly, for example, in an implementation of the SRTPS, using the BDL as described below, or otherwise, for use by a CCP of an electronic trading system, each novated transaction may be considered a bilateral assertion, reflecting the obligation, to buy or sell, undertaken by the trader to the CCP, made by the CCP to the trader, or clearing member, for that side of the trade.

For example, a CCP may electronically implement three logical ledgers using the disclosed SRTPS functionality for each of primary clearing functions: an electronic obligation ledger, e.g. for front end clearing, accessible by the CCP as well as the clearing members and their front end clearing systems to implement trade capture for new trades, amended trades and canceled trades, i.e. to essentially maintain a running tally of obligations; an electronic position ledger which records the netted tally of novated obligations, i.e. as between the CCP and each trade participant, e.g. takes information from the obligation ledger and maintains a netted tally, i.e. an overall net obligation for each of the parties and the central counter party; and an electronic cash ledger integrated with banks and/or clearing members and their back-end clearing systems that holds the netted cash obligations obtained by calculating risk and margin requirements as well as crediting and/or debiting margin accounts against the participants' financial accounts, e.g. maintains a running tally of all money that is to be transacted among the counter parties, e.g. to meet obligation, margin/risk and settlement requirements, and may take information from the position ledger.

It will be appreciated that each of these logical ledgers, e.g. the electronic obligations ledger and electronic positions ledger, may be implemented in a single instance of the SRTPS shared data structure to which all parties are participants as described herein, with each logical ledger being implemented via specific assertion types among specific participants or by specific tables and entries in an associated data structure of the SRTPS. Alternatively, separate implementations of the SRTPS may be implemented for each logical ledger.

SRTPS may include support for queries, indexes, views, triggers, procedures, user groups, permissions, objects, statements and other database functions. For example, functionality for statements such as SHARE, UNSHARE, DISCLOSE, and NOTIFY may be implemented. The statements include support for choosing choose rows and columns to be shared with counterparties—SHARE, UNSHARE, support for record state visibility to applications—e.g. where extra information can be retrieved to check state (DISCLOSE), and support for incoming data validation and confirmations (NOTIFY) among others.

Each of the ledgers that interacts with a SRTPS instance 371, e.g. the electronic obligations ledger and electronic positions ledger, for example, permits a clearing member to make a change regarding their perception of a result of trade-related function/operation, or a modification to a trade-related result, subject to validation by the CCP, as described herein, whereby such validation implicitly updates the records stored by both parties, avoiding, for example, a request/response message exchange and/or periodic reconciliation. In the case of the electronic cash ledger, additional parties such as banks and/or other financial institutions may be participants so as to validate or be notified of financial obligations undertaken by parties with respect to funds maintained on account for those parties by the banks/financial institutions and may facilitate fund transfers between those accounts the accounts maintained by the central counterpart in satisfaction of those obligations.

In particular, regarding the electronic cash ledger, the integration with, i.e. participation in the disclosed SRTPS by, financial institutions, such as banks and other funding sources, may enable direct movement of money in response to a cash obligation posted by the CCP on the electronic cash ledger. Financial institutions, as participants using a SRTPS as described herein, may respond to obligations, i.e. assertions thereof, posted to the cash ledger by moving the monies and posting back, e.g. via validation or a counter-assertion, on the cash ledger reflective of the movement. Thus, the cash ledger will be a running tally of obligations and money movements that can be netted down to a final tally on the ledger periodically or continuously by the CCP, e.g. twice a day—midday and end of day.

In another example, when an average price is necessary for a set of trades, a trader/clearing firm typically makes a request to the CCP for the average price value, which, responsive to the request, is then computed by the CCP, stored in the CCP's local database and finally communicated back to the requesting trader/clearing member. In contrast, using the SRTPS as described herein, a trader or clearing firm may themselves compute this average price and store it on a data structure that interacts with a SRTPS instance 371 either directly or by integration with an application. The change is automatically communicated using a BDL to an instance of the SRTPS running on the CCP which then validates the assertion, i.e. approves of the value calculated by the trader/clearing firm such as by using business rules/logic which recalculate and compare the proposed value, which, once approved, is then updated.

In another example, the SRTPS may be used to implement a trade register to record cleared trades and which is shared with market participants eliminating end-of-day reconciliation processes while provided a mechanism to allow market participants make post-trade modifications such as "give up", trade split and reassignment.

In another example, the SRTPS may be used to implement post trade management. In particular, a financial exchange, such as the Chicago Mercantile Exchange ("CME") may implement four primary functions: order matching; execution; risk management; and trade settlement—commonly referred to as trading (matching and execution) and clearing (risk management and settlement). As was discussed elsewhere herein, the clearing function is typically performed is by novating the trade i.e. CME inserting itself in the middle of a BUY/SELL agreement and becoming the buyer for the seller and seller for the buyer for matched trades.

Once a novation is performed with regards to a particular matched trade, there may only be certain types of changes allowed to that trade. For example:
  1. Change to specific attributes like account/origin (Give Up), price (Average Pricing), customer type indicator etc.;
  2. Combining of several trades into one (Compression); or
  3. Taking a single trade and splitting it into many and assigning it to various other parties (Allocate and Claim).

For unmatched trades, i.e. offers or orders to trade, in comparison, more aspects, e.g. trade attributes, of the trade may typically be modified subsequent to submission of the trade, so that it eventually results in a matched trade, such as the trade order may be canceled, or parameters of the trade order, e.g. price or quantity, may be modified.

Changes to a matched/novated trade directly change the trade in the data store in which the trade record for that trade is stored in the clearing systems. Whereas in prior systems, such changes would be made via a request by the clearing member/market participant and a response thereto from the exchange, using the SRTPS as described herein, the above post trade modification functions no longer rely on a request/response interaction, e.g. a clearing member submits a request for Average Pricing, CME performs the requisite computations and sends a response back or a clearing member request a modification to a trade, CME performs the modification and sends back a confirmation indicative thereof. Instead, using a SRTPS implementation, as described herein, the clearing member directly changes the trade record to, for example, reflect their computation of the average price or the trade modification they wish to make, and the SRTPS takes care of obtaining the counter-party validation, e.g. CME in the case of average pricing, or the other party to the trade in the case of and Allocate and Claim operation, and synchronizes the data stores of both the exchange and the interested parties maintaining copies of those trade records. The communication layer is thus hidden from the parties, with the replication, validation, and syncing performed automatically without further input or programming on behalf of either party.

With regards to position management, trades are usually netted down into buckets in a manner similar to a bank computing and end of day balance for a bank account. Such netting may help with periodic reconciliation between the exchanges data store and a copy thereof maintained by a clearing member, i.e. a clearing member may simply compare the trade count and netted dollar value to determine if their data is in sync with CME for the account. This netting function is referred to as "Positions Management." Clearing firms typically have multiple position accounts with each position account typically being subject to the margin requirements. Further clearing members typically maintain, e.g. as required by regulations, a "house" account, i.e. an account used by the firm to manage its own money, separate from their customers' accounts, i.e. the accounts that are used to manage the clearing firm's customer's money.

Clearing firms may apply functions to these position accounts which result in changes thereto. For example, a common activity performed by a clearing firm on a position account is PCS (Positions Change Submission) which may be used to offset opposing positions held by the same entity as known to the clearing firm. For example, consider a position account that holds 100 Long×60 short for a particular product where the clearing firm determines that 20 of the Longs can be offset against 20 Short because they actually belong to the same entity (which the exchange may never know where it does not have visibility into the customers of clearing members), the clearing member may submit a PCS request to make 100L×80S into 80L×60S.

Effectively this too is an attribute change on a positions record in the positions database and may be implemented using the SRTPS as described herein. For example, using the SRTPS, the clearing member simply updates the data structure which is communicated to the SRTPS. The SRTPS process syncs up to the exchange, e.g. via a BDL as described herein. The exchange may simply validate that 100−80=80−60.

It will be appreciated that the SRTPS may be used to implement any bilateral transactional environment featuring a maker of assertions, e.g. in any issuer/issue environment, including, but not limited to, assertions as to agreements between parties and assertions of authorization, license, certification or accreditation by one party to another, or between two parties for the benefit of a third party beneficiary. This may be referred to as an "Internet of Assertions" or "IoA." That is, one party may make an assertion to be validated by a counter party for the purpose of evidencing such a validation to a third party.

For example, an authorizing, certifying, licensing or accrediting authority, such as an industry, regulatory, governmental or educational authority, may use SRTPS to issue an authorization, license, certification or accreditation, such as a driver's license, professional or business license, visa, passport, diploma, etc., on behalf of one party to another party. Effectively, as described elsewhere herein, the authority may use SRTPS to indicate the assertion of the fact that they have issued the authorization, license, certification or accreditation to a particular party or entity. The SRTPS provides replication for a data store that may be accessed by systems or programs of the authority to update and replicate data across distributed systems. Other interested parties to that data may be parties that seek to know or validate that the particular party or entity is in fact authorized, licensed, certified or accredited by the authority.

Alternatively, a party purporting to be authorized, licensed, certified, or accredited by an authority may use SRTPS to replicate modified data to which the authority is an interested party whereby the authority validates, or not, the modification effectively confirming whether or not the party purporting to be authorized, licensed, certified or accredited by the authority is in fact so certified/accredited.

SRTPS interacts with the data structure to propagate modifications to other instances and external data structures. Each data structure may store and maintain distinct sets of data. As such, the data store for one SRTPS instance 371 must be selectively replicated and shared as opposed to replicating the entirety of the data store. Each counter-party participant may maintain their own copy of the data in which they have an interest. The counter-party participant, upon approving of the request can immediately update any copy of the data that they have in accordance with the requested change, as it is assured that the requested change, which was submitted by the requesting party participant, has already been approved by the requesting party participant. As such, the counter-party participant's copy of the data is immediately reconciled. Herein such reconciliation may be referred to as real time or self-reconciliation or that the data structure is real time or self-reconciling, immediately reconciled, reconciled in real time or inherently reconciled. Furthermore, as data is only replicated selectively, i.e., only among the portions of the data structure belonging to the participants which have an interest in that data, unnecessary data transmissions and replication are avoided and, as will be seen, the security of the data is thereby improved.

For example, in one embodiment, a computer implemented method for implementing a SRTPS instance 371 is disclosed. The SRTPS may interact with a shared data structure that contains data that is of interest to the operator of the SRTPS. The shared data structure may be stored in a memory, and a portion of the shared data structure may be coupled with a processor. The method comprises receiving, by a processor, a data change request for the shared data structure; identifying, by the processor, one or more participants of the plurality of participants with permission to view the data change request; generating, by the processor, using a schema shared with the plurality of participants, a data change message from the data change request; transmitting, by the processor, via a network interface, the data change message to the one or more participants; receiving, by the processor via the network interface responsive to the data change message, a validation data message from each of the identified at least one or more participants, each of the received validation data messages comprising data indicative of a response to the data change message; determining, by the processor, based on the received validation data messages, that all of the identified one or more participants have validated the data change request, and updating, by the processor, the shared data structure with the data change request. In another embodiment, the method comprises receiving, by a processor via a network interface coupled with the processor, an assertion message from a first participant of the plurality of participants, the assertion message comprising data indicative of a request to modify data stored in the shared data structure; translating, by the processor, using a shared schema, the data indicative of a request to modify data stored in the shared data structure; validating, by the processor, the data indicative of a request to modify data stored in the shared data structure; and updating, by the processor, the shared data structure with the translated data.

Each SRTPS instance 371 utilizes implicit communications to allow any participant to make changes using a local application, with the changes automatically validated and replicated to other interested parties by the SRTPS and a BDL. A system implemented in accordance with SRTPS allows for recording transactions as a series of bilateral assertions. Such transactions may be recorded atomically, making sure all transactions are valid before commitment. Assertions or transactions may represent any data that is mutually acceptable. One use case for SRTPS is to eliminate business level messaging, such as the request/response messages used in traditional clearing models for financial exchanges, e.g. messaging used to perform transaction confirmation and data reconciliation.

In one embodiment, SRTPS is implemented using a BDL in a manner which provides immutability, irrefutability, confidentiality, recoverability, atomicity, and durability. Immutability generally means that data stored in the data structure is unable to be changed, i.e. that once the data is agreed upon there can be no subsequent undetectable changes to that data. Generally, immutability is implemented by providing mechanisms which allow detection of any unapproved changes made to the stored data.

Immutability by its nature does not ensure that a particular change to data was legitimate. Irrefutability generally means that something is impossible to deny and is therefore legitimate. When data is both immutable and irrefutable, it may be considered tamper proof, i.e. any alteration is detectable and the parties are unable to deny the legitimacy of the unaltered data. Generally, irrefutability is implemented by providing mechanisms which link data to a particular participant in an unalterable, i.e. wherein alterations a readily detectable, manner. In the disclosed embodiments, irrefutability is implemented using a public key encryption methodology where a participant signs transactions using a private cryptographic key known only to them, the signature being verifiable using the corresponding public cryptographic key. It will be appreciated that the irrefutability of a transaction may, therefore, be limited to confirming the association between a particular private cryptographic key and a transaction signed thereby but may not be dispositive of the identity of the participant who used that key, e.g. a participant's private cryptographic key may have been stolen.

By restricting the replication of data only among distributed portions of the data structure belonging the participants having an interest in that data, referred to as "selective replication," transactional confidentiality is implemented as uninterested participants will not receive copies of the data, e.g. participants would not be aware of transactions to which they are not party. To further ensure confidentiality, cryptographic keys may be used to encrypt and/or sign transactions, i.e. cryptographically encode/sign the data stored in the data structure indicative of the transaction, between participants. In this way, to have access to a given participant's data, one would need both the data and the participant's cryptographic key. As compared to blockchain where everyone already has a copy of the data, this adds an additional level of security and may ensure greater confidentiality and confidence in the system.

Recoverability refers to fault tolerance, such as the ability to recover lost data, and preserves the integrity of the data structure. In the disclosed system, as will be described, transactions are replicated among the participants thereto. Accordingly, should a participant lose their copy of a transaction, they may recover the lost data by requesting a copy from the counter-party to that transaction. A participant's entire transactional record could be recovered by making such requests from all of participants which have been counter-parties to those transactions. As each copy of a transaction is both irrefutable and immutable, as described above, the requesting participant can be assured that is receiving an accurate reproduction of what was lost. In a multilateral implementation as will be described, using witness and/or watcher parties, i.e. non-interested third party participants which also store copies of transactions, fault tolerance may be improved via the additional redundancy provided.

A bilateral distributed ledger (BDL), according to the disclosed embodiments, may also have the properties of atomicity and durability. Atomicity means "all or nothing," i.e. that transactions, or assertions, are only final and recorded when all parties to a transaction have agreed to proceed with the transaction. Durability means that once data is signed and confirmed by the interested participants, it is stored in each of those interested participant's portions of the data structure and may be fully recoverable. Since each participant that is interested in particular data stored in the data structure retains a copy of that data, that data may be thought of as durable.

Given the abovementioned properties, the disclosed embodiments may be used in place of centralized databases/DBMS's and, in particular for example, such databases which implement a system of record, such as the clearing mechanisms implemented by a Central Counter Party ("CCP") of an electronic trading system. This may, for example, be used as a source of truth for records and eliminate the need for reconciliation in a CCP model, thereby giving all parties to a transaction relatively immediate visibility into the finalized records. A distributed consensus, as will be described, may then be applied to make sure that each record has confirmations from all participants to a transaction regarding authenticity of data, and serving as a legally binding agreement to its contents. For example, a requested change to data, which does not have all authorizing cryptographic signatures may not be allowed, or otherwise considered, to be stored in the system, that is the record may exist in the data structure but it may be regarded as incomplete, unenforceable, or otherwise invalid.

Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions here before or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

FIG. 5 depicts a flow chart 700 showing example operation of the system 300 of FIG. 3. In particular FIG. 5 shows an example computer implemented method for facilitating interaction with a shared data structure, stored in a memory, by a plurality of participants.

At act A702, a data change request for the shared data structure is received. The SRTPS may identify the data change request by identifying a change to the data structure from an external program. In an example, a user may enter a value in field for a program. The program interfaces with the shared data structure as it would any other database, for example, a SQL database. SQL, or the Structured Query Language, is the ANSI standard language for manipulating and retrieving data from databases. A clearinghouse application, for example, may request a change to the data structure using SQL commands.

At act A704, one or more participants of the plurality of participants are identified with permission to view the data change request. The data structure of the SRTPS includes permissions for each record or table of data. A user may be able to access only certain tables, or the user may be restricted to certain rows and columns within a table. The subset of data available to a user is called the user's security view. Authorization to make changes may also be controlled with assigned privileges. Each of the participants may store different portions, e.g. records or tables, of the data. The data is replicated only to those parties/participants that store the particular data.

At act A706, a data change message is generated using a schema shared with the plurality of participants. The data change message may be formatted to describe a transaction, including the participants, the assertion (e.g. payload, e.g. describing the data change), signatures, and other information. Particular fields may include a transaction ID and counterparty ID, an ObserverID, an Assertion, Signatures, and a Hash.

For the Assertion, data, the SRTPS uses a shared schema. For example, each data structure may include a collection of tables that store interrelated data. Each data structure may store different data depending on the permissions of the data. In a basic implementation, all the data is stored in tables, that are made up of rows and columns. The SRTPS may include support for queries, indexes, views, triggers, procedures, user groups, permissions, objects, statements and other database functions. For example, additional functionality for statements such as SHARE, UNSHARE, DISCLOSE, and NOTIFY may be implemented. The statements include support for choosing choose rows and columns to be shared with counterparties—SHARE, UNSHARE, support for record state visibility to applications—e.g. where extra information can be retrieved to check state (DISCLOSE), and support for incoming data validation and confirmations (NOTIFY) among others.

The SRTPS is configured to define message schemas for replication of the persistent store. In an embodiment, JavaScript Object Notation (JSON) may be used for the schema of the SRTPS and the assertion field. Alternative schemas may be used that include similar functions, for example, such as cross-referencing. The schemas are shared with other participants. The sharing of the schema may occur prior to the acts of this method or may be implemented as needed. For example, for an existing data record in the shared data structure, the schema may already be shared between all participants. However, for a new table or record, the SRTPS instance 371 requesting the change may need to DECLARE a schema and other variables so that the other instances can properly interpret the replication messages.

One possible SRTPS Interface is described below. In an embodiment, SRTPS is configured using representational state transfer (REST) and JSON. For example, the SRTPS interface may be REST for administration, transaction submission, queries and validations. One example for using REST is defined below First a schema is defined using the DECLARE statement:
DECLARE SCHEMA {<schema> AS <schema-name>}
An example for the DECLARE command is:
declare schema
{
"$schema": "http://json-schema.org/schema#",
"id": "https://srtps.cme.com/Person#",
"title": "Person",
"type": "object",
"properties": {
"first_name": {"type": "string"},
"last_name": {"type": "string"},
"birthday": {"type": "string", "format": "date-time"},
"address": {
"type": "object",
"properties": {
"street_address": {"type": "string"},
"city": {"type": "string"},
"state": {"type": "string"},
"country": {"type": "string"}
}
}
}
}

Alternatively, the command may be: declare schema https://srtps.cme.com/Person as Person Prior to sharing the schema with a counterparty, the counterparties must also be declared as describe below:
DECLARE COUNTERPARTY [<counterpartyURL> AS <counterparty>}
Examples→
declare counterparty https://srtps.counterparty1.com as Counterparty1

Other forms of declaration may also be used to declare callbacks DECLARE CALLBACK {<callbackURL> FOR <schemaname>}
Examples→
declare callback https://srtps-internal.cmegroup.com for Person The "declare" command can be considered administrative or setup (DDL).

To generate the data change message, the SRTPS may use one or more commands such as ASSERT to.
ASSERT TO <counterparty> AS {<signatory|witness|watcher>] [<schemaname>{<data>}]
Examples→
assert to Counterparty1 as Signatory
Person
{
"$id": 234,
"first_name": "Tom",
"last_name": "Hanks"
}

One could then revoke or replace a transaction
REVOKE <schemaname><id>
Examples→
revoke Person 234

"Revoke" may be considered like a RDBMS "delete" statement. The equivalent of the update statement would be the "replace" but unlike the limitation imposed by SQL—the unique identifier may be updated REPLACE <schemaname><id> WITH <data>
Examples→
replace Person 234 with
{
"$id": 123,
"first_name": "Jack",
"last_name": "Hanks"
}

Another example of a command is a query ability:
QUERY <schemaname>[<template>|WHERE <query>]
Examples→
query Person
{
"$id": 123,
}
Alternatively: query Person where $id=123 and first_name="Jack"

Referring back to FIG. 5, at act A708, the data change message is transmitted to the one or more participants. At act A710, responsive to the data change message, a validation data message is received from each of the identified at least one or more participants. Each of the received validation data messages comprises data indicative of a response to the data change message. A communication of a participants request message or intention to change data in the data structure may cause, e.g. automatically, the counter party-participant to evaluate the change according to business logic or business rules, such as via an external program or external review process, to determine whether the change is acceptable/valid. An SRTPS instance 371 running at the counter party-participant may validate and generate the validation data message according to business logic/business rules accessible by the SRTPS. The business logic/rules may comprise automated and/or manually performed evaluation, calculation, and/or verification rules and/or processes which determine the acceptability of the requested change to the counter-party participant. In one embodiment, the business logic/business rules may be a simple approval of any change without any further analysis wherein the validation indicates merely that the counter-party has received and is aware of the modification. Alternatively, where the requested change relates to a calculated value, either mathematical or logical, the business rules/business logic may recalculate the value, using the same or a different calculation methodology, and compare the proposed value with the recalculated value to determine whether they are equivalent or not. The business logic/business rules may further define, where the proposed value differs from the recalculated value, an acceptable range by which those values may differ. Other business rules/business logic may validate an assertion of fact against an independent source for that fact to confirm the veracity of the assertion. Still other business rules/business logic may define subjective or objective thresholds, value ranges, or sets of values, such as for measures of risk, as a specification for when an assertion is valid or not. Business rules/business logic could also simply implement a process to confirm that the recipient received the request and/or that a user, such as an auditor, logged, reviewed or was otherwise made aware of the request.

At act A712, the data change message is determined to be valid. The counter-party participant need not receive any confirmation message as it is already aware that if it approved the change, the change will be made, and if it did not approve the change, the change will not be made. In implementations using a shared data structure maintaining a single copy of the data to which all participants have access, each data record in the data structure may include specific and unique permissions defining which participants may access data stored therein, e.g. defining which participants may be permitted to attempt or otherwise request a modification the data in that particular data record and which other participants have an "interest" therein and should be notified as described above, where the permissions may vary for each data record in the data structure. It will be appreciated that such a shared data structure may be maintained by either party, or maintained separate therefrom, in such a manner as to provide the requisite access to parties to attempt to make modifications and receive implicit communications related thereto, as described. Exemplary implementations are described herein. If, in one implementation, the party and the counter-party participant were each maintaining their own copy of the data, the counter-party may reliably update this copy based on its response, i.e. be assured that its copy reflects the same state as the copy of the data structure maintained by the party, and avoid any need to later reconcile this copy.

In one embodiment, assertions which are rejected or otherwise disapproved of by the counter-party participant are not stored or otherwise reflected in the data structure. Alternatively, the proposed assertion, along with data indicative of the rejection or disapproval by the counter-party participant, are stored in the shared data structure to, for example, provide a record thereof. As used herein, an approved request to change data in the data structure may be referred to as making the requested change "visible" whereas a disapproved/rejected change is not made visible, wherein visibility refers the logical interpretation of the data stored or not stored in the data structure along with any additional data indicative of the approval or disapproval thereof.

At act A714, the shared data structure is updated with the data change request. If the counter-party participant validates the intention of the party to change the data, e.g. responds to the validation request approving the requested change, e.g. acceding to the assertion of fact or agreeing to the proposed agreement, the data structure is updated in accordance therewith as both parties, who are the only parties interested in that data, have approved the change. If the counter-party participant responds to the validation request disapproving of the requested change, the data structure is not modified. The requesting party-participant is notified of the result, i.e. that the requested change was made or not, via a confirmation message. This validation acts to confirm the veracity of the assertion relative to the counter-party, i.e. it is the counter-party's assertion as to whether it considers the party's assertion to be true or not, or otherwise acceptable. Accordingly, the validation, where approving the modification, may serve as a confirmation, agreement, authorization, license, certification, accreditations, etc., or in the case where the validation disapproves of the modification, it may serve to indicate that the party is wrong/mistaken, is lying, there is a disagreement, that the party is not authorized, not certified, not licensed or not accredited. It will be appreciated that the semantics of the validation depend upon the semantics of the assertion.

The data change request enshrined in the statement may be the actual assertion bytes that have business context and content. The statement may be thought of as a payload. It may or may not be encrypted with the public key of the recipient depending on the wire protocol.

The above implementations may further require a sophisticated identity management system to provide the following features: Securely and privately certify participants (as in Know Your Customer ("KYC")); cryptographically signing single use transaction keys in a manner which can be used to verify authenticity of the participant without revealing their identity; and revoke certificates to evict compromised users from the system.

In one embodiment, the system 700 described above may be coupled with an external process and/or device, not shown, which monitors the data structure of the SRTPS for modifications thereto, such as for validated modifications, and implements actions based thereon. For example, in a financial implementation where the validated modification comprises an assertion of a debt to another party, the external process and/or device, upon determining that the assertion has been validated, acts in accordance therewith to cause funds to be transferred or disbursed in satisfaction of the debt. The system 700 provides an interface, such as an application program interface, via which other software and/or devices may access the shared data structure 304, such as to make queries, i.e. pull data from the shared data structure 304, or receive unsolicited data, updates or messages, i.e. data pushed from the shared data structure 304. These other software and/or devices may then implement further actions based on the receipt of data and/or the result of the query.

Figure 6:
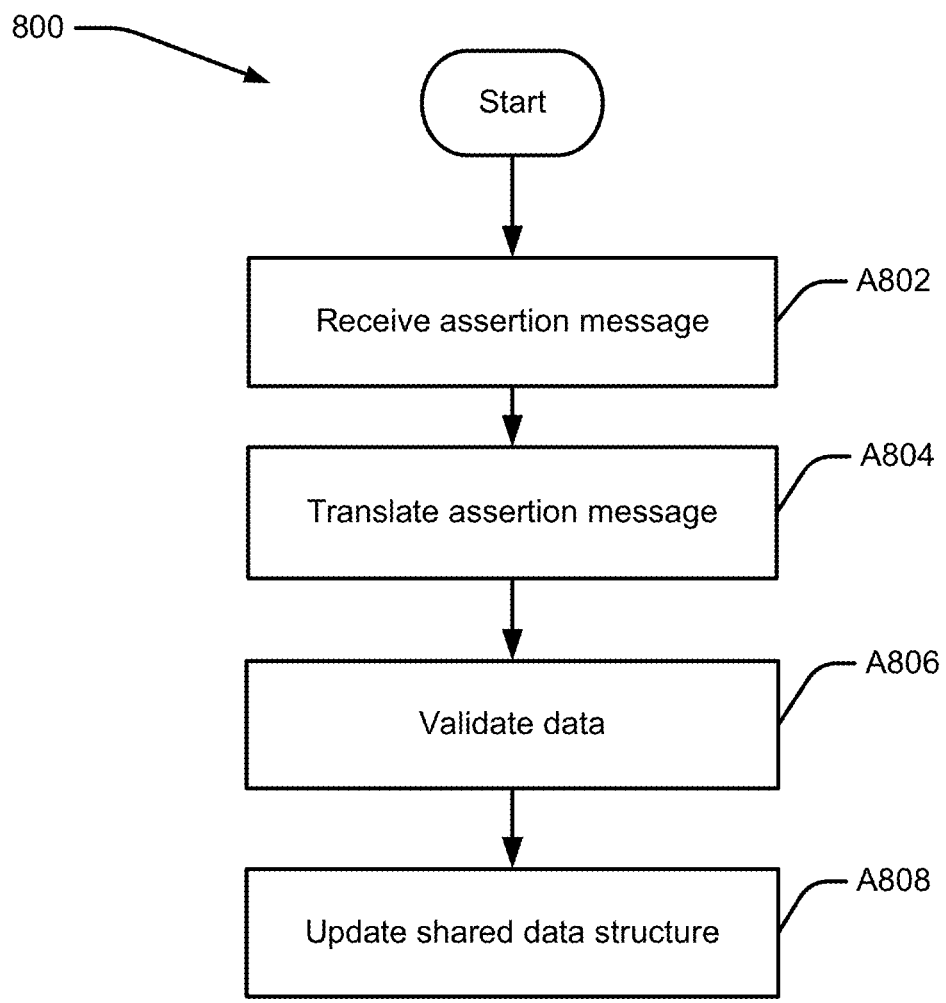
FIG. 6 depicts a flow chart showing operation of the system of FIGS. 2-4 according to one embodiment.

FIG. 6 depicts a flowchart 800 for a computer implemented method for facilitating interaction with a shared data structure, stored in a memory, by a plurality of participants.

At act A802 a processor receives via a network interface coupled with the processor, an assertion message from a first participant of the plurality of participants, the assertion message comprising data indicative of a request to modify data stored in the shared data structure. The assertion message is formatted using a schema shared with the plurality of participants. The assertion message may be formatted to describe a transaction, including the participants, an assertion (e.g. payload, e.g. describing the data change), signatures, and other information.

At act A804, the processor translates using a shared schema, the data indicative of a request to modify data stored in the shared data structure. For the assertion(s), the SRTPS uses a shared schema. The assertion(s) in the assertion message may contain a string or command that specifies data records or tables that are to be changed in the shared data structure. The SRTPS interprets the assertion(s) using the shared schema to comprehend the change that is requested. The SRTPS is configured to define message schemas. In an embodiment, JSON may be used for the schema of the SRTPS and the assertion field. Alternative schemas may be used that include similar functions, for example, such as cross-referencing. The schemas are shared with other participants. The sharing of the schema may occur prior to the acts of this method or may be implemented as needed. For example, for an existing data record in the shared data structure, the schema may already be shared between all participants. However, for a new table or record, the SRTPS instance 371 requesting the change may need to DECLARE a schema and other variables so that the other instances can properly interpret the replication messages.

At act A806, the processor validates the data indicative of a request to modify data stored in the shared data structure. The data indicative of the request may be validated based on business rules, e.g. commonly agreed rules, the shared schema, or by confirmation from other participants. In a simple bilateral communication, e.g. where one participant requests a change, the SRTPS may validate the change as long as the change is permissible under commonly agreed rules, for example when calculating values for records. In a communication that requires the agreement from multiple parties, for example defining a value for a record that multiple parties have an interest in, the SRTPS may require validation message from each of the participants.

At act A808, the processor updates the shared data structure with the translated data. Once validated, the shared data structure is updated. During the process of acts A802-808, the record or table that is operated on may be locked from local edits. For example, a data request may take some period of time during which a local application may request a change. The local application may be denied due to the pending update. When awaiting validation, the assertion messages, the assertions, data change requests, data changes, etc. may be stored locally in the SRTPS until the change/assertion is validated and the data structure updated. In addition, all messages communication between SRTPS instances 371 may be stored so that a recovery of the data is possible.

FIG. 7 shows an illustrative embodiment of a general computer system 1000 which may be used to implement the system of FIG. 3. FIG. 7 includes a bus 1002, a display 1004, a drive unit 1006, a computer readable medium 1008, instructions 1010, a connection to the internet and/or other networks 1020, a processor 1004, a network interface 1018, a user interface 1016, a memory 1012, and instructions 1010.

The computer system 1000 may include a set of instructions that may be executed to cause the computer system 1000 to perform any one or more of the methods or computer based functions disclosed herein. The computer system 1000 may operate as a standalone device or may be connected, e.g., using a network, to other computer systems or peripheral devices. Any of the components of the electronic trading system 100 discussed above may be a computer system 1000 or a component in the computer system 1000. The computer system 1000 may implement a match engine, margin processing, payment or clearing function on behalf of an exchange, such as the Chicago Mercantile Exchange, of which the disclosed embodiments are a component thereof.

In a networked deployment, the computer system 1000 may operate in the capacity of a server or as a client user computer in a client-server user network environment, as a peer computer system in a peer-to-peer (or distributed) network environment, or as a network device such as a switch, gateway or router. The computer system 1000 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 1000 may be implemented using electronic devices that provide voice, video or data communication. Further, while a single computer system 1000 is illustrated, the term "system" shall also be taken to include any collection of systems or sub-systems that individually or jointly execute a set, or multiple sets, of instructions to perform one or more computer functions.

As illustrated in FIG. 7, the computer system 1000 may include a processor 1004, e.g., a central processing unit (CPU), a graphics processing unit (GPU), or both. The processor 1004 may be a component in a variety of systems. For example, the processor 1004 may be part of a standard personal computer or a workstation. The processor 1004 may be one or more general processors, digital signal processors, application specific integrated circuits, field programmable gate arrays, servers, networks, digital circuits, analog circuits, combinations thereof, or other now known or later developed devices for analyzing and processing data. The processor 1004 may implement a software program, such as code generated manually (i.e., programmed).

The computer system 1000 may include a memory 1012 that may communicate via a bus 1002. The memory 1012 may be a main memory, a static memory, or a dynamic memory. The memory 1012 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 1012 may be a memory component of a reconfigurable logic device, e.g. an FPGA. In one embodiment, the memory 1012 includes a cache or random access memory for the processor 1004. In alternative embodiments, the memory 1012 is separate from the processor 1004, such as a cache memory of a processor, the system memory, or other memory. The memory 1012 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 1012 is operable to store instructions executable by the processor 1004. The functions, acts or tasks illustrated in the figures or described herein may be performed by the programmed processor 1004 executing the instructions 1010 stored in the memory 1012, or the instructions 1010 coupled with the processor 1004. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, the computer system 1000 may further include a display unit 1014, such as a liquid crystal display (LCD), an organic light emitting diode (OLED), a flat panel display, a solid state display, a cathode ray tube (CRT), a projector, a printer or other now known or later developed display device for outputting determined information. The display 1014 may act as an interface for the user to see the functioning of the processor 1004, or specifically as an interface with the software stored in the memory 1012 or in the drive unit 1006.

In a particular embodiment, as depicted in FIG. 7, the computer system 1000 may also include a disk or optical drive unit 1006. The disk drive unit 1006 may include a computer-readable medium 1008 in which one or more sets of instructions 1010, e.g. software, may be embedded. Further, the instructions 1010, may embody one or more of the methods or logic as described herein. In a particular embodiment, the instructions 1010, may reside completely, or at least partially, within the memory 1012 and/or within the processor 1004 during execution by the computer system 1000. The memory 1012 and the processor 1004 also may include computer-readable media as discussed above.

The present disclosure contemplates a computer-readable medium that includes instructions 1010, or receives and executes instructions 1010, responsive to a propagated signal, so that a device connected to a network 1020 may communicate voice, video, audio, images or any other data over the network 1020. Further, the instructions 1010, may be transmitted or received over the network 1010, via a communication interface 1018. The communication interface 1018 may be a part of the processor 1004 or may be a separate component. The communication interface 1018 may be created in software or may be a physical connection in hardware. The communication interface 1018 is configured to connect with a network 1020, external media, the display 1014, or any other components in system 1000, or combinations thereof. The connection with the network 1020 may be a physical connection, such as a wired Ethernet connection or may be established wirelessly as discussed below. Likewise, the additional connections with other components of the system 1000 may be physical connections or may be established wirelessly.

The network 1020 may include wired networks, wireless networks, or combinations thereof. The wireless network may be a cellular telephone network, an 802.11, 802.16, 802.20, or WiMax network. Further, the network 1020 may be a public network, such as the Internet, a private network, such as an intranet, or combinations thereof, and may utilize a variety of networking protocols now available or later developed including, but not limited to TCP/IP based networking protocols.

Embodiments of the subject matter and the functional operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer program products, i.e., one or more modules of computer program instructions encoded on a computer readable medium for execution by, or to control the operation of, data processing apparatus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer readable medium may be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them.

In a particular non-limiting, exemplary embodiment, the computer-readable medium may include a solid-state memory such as a memory card or other package that houses one or more non-volatile read-only memories. Further, the computer-readable medium may be a random access memory or other volatile re-writable memory. Additionally, the computer-readable medium may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit.

Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations may include distributed processing, component/object distributed processing, and parallel processing. Alternatively, virtual computer system processing may be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments of the subject matter described in this specification may be implemented on a device having a display, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments of the subject matter described in this specification may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the subject matter described in this specification, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these may not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable sub-combination.

Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings and described herein in a particular order, this may not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above may not be understood as requiring such separation in all embodiments, and it may be understood that the described program components and systems may generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it may be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

What is claimed is:

1. A computer implemented method comprising:
   receiving, via a network interface of a processor of a first instance of a plurality of remote instances, a data change request communicated by a second instance of the plurality of remote instances, the data change request comprising data indicative of a request to modify a shared data structure comprising a relational database stored in a memory coupled with the processor;
   identifying, by the processor of the first instance, one or more instances of the plurality of remote instances to validate the data change request;
   transmitting, by the processor of the first instance based on the data change request, via the network interface, a data change validation request message to the identified one or more remote instances;
   receiving, by the processor of the first instance via the network interface responsive to the data change validation request message, a validation data message from at least one of the identified one or more remote instances, each of the received validation data messages comprising data indicative of a response to the data change validation request message as being validated or not;
   determining, by the processor of the first instance, based on the received validation data messages, that all of the identified one or more remote instances have validated the data change request;
   when all of the identified one or more remote instances have validated the data change request, updating, by the processor of the first instance, the shared data structure with the data change request; and
   when less than all of the identified one or more instances have validated the data change request, not updating, by the processor of the first instance, the shared data structure with the data change request.

2. The computer implemented method of claim 1, wherein the data change request is received from an application programming interface connected to the first instance.

3. The computer implemented method of claim 1, wherein the shared data structure comprises different sets of data for each of the remote instances.

4. The computer implemented method of claim 1, wherein the updating, by the processor of the first instance, of the shared data structure with the data change request comprises committing the requested modification of the received data change request to the relational database.

5. The computer implemented method of claim 1, wherein the data change message comprises an assertion of a transaction.

6. The computer implemented method of claim 5, wherein the assertion comprises a novation of a trade transaction by an electronic trading system.

7. The computer implemented method of claim 1, wherein the data change message comprises a change of permission for data in the shared data structure.

8. The computer implemented method of claim 1, wherein the identified one or more remote instances of the plurality of remote instances are characterized as at least one of a participant, a witness, or a watcher.

9. The computer implemented method of claim 1, wherein the first instance and each of the identified one or more remote instances share a schema using JavaScript Object Notation.

10. The computer implemented method of claim 1, wherein the identifying, transmitting, receiving of the validation messages and determining are performed using a bilateral distributed ledger ("BDL").

11. The computer implemented method of claim 1, wherein each instance of plurality of remote instances comprises an instance of the shared data structure which is maintained thereby.

12. A system comprising:
   a plurality of remote instances, each comprising a processor and a memory, the memory storing computer executable instructions that, when executed by the processor, cause the processor to:
      receive, via a network interface coupled with the processor, a data change request communicated by a second instance of the plurality of remote instances, the data change request comprising data indicative of a request to modify a shared data structure comprising a relational database stored in the memory;

identify one or more instances of the plurality of remote instances to validate the data change request;

transmit, based on the data change request, via the network interface, a data change validation request message to the identified one or more remote instances;

receive, via the network interface responsive to the data change validation request message, a validation data message from at least one of the identified one or more remote instances, each of the received validation data messages comprising data indicative of a response to the data change validation request message as being validated or not;

determine, based on the received validation data messages, that all of the identified one or more remote instances have validated the data change request;

when all of the identified one or more remote instances have validated the data change request, update the shared data structure with the data change request; and when less than all of the identified one or more instances have validated the data change request, not update the shared data structure with the data change request.

13. The system of claim 12, wherein the data change request is received from an application programming interface connected to the first instance.

14. The system of claim 12, wherein the shared data structure comprises different sets of data for each of the remote instances.

15. The system of claim 12, wherein the update of the shared data structure with the data change request comprises a commit of the requested modification of the received data change request to the relational database.

16. The system of claim 12, wherein the data change message comprises an assertion of a transaction.

17. The system of claim 16, wherein the assertion comprises a novation of a trade transaction by an electronic trading system.

18. The system of claim 12, wherein the data change message comprises a change of permission for data in the shared data structure.

19. The system of claim 12, wherein the identified one or more remote instances of the plurality of remote instances are characterized as at least one of a participant, a witness, or a watcher.

20. The system of claim 12, wherein each of the identified one or more remote instances share a schema with the identifying instance using JavaScript Object Notation.

21. The system of claim 12, wherein the identification, transmission, receipt of the validation messages and determination are performed using a bilateral distributed ledger ("BDL").

22. The system of claim 12, wherein each instance of plurality of remote instances comprises an instance of the shared data structure which is maintained thereby.

23. A system comprising:

means for receiving, via a network by a first instance of a plurality of remote instances, a data change request communicated by a second instance of the plurality of remote instances, the data change request comprising data indicative of a request to modify a shared data structure comprising a relational database stored in a memory;

mean for identifying, by the first instance, one or more instances of the plurality of remote instances to validate the data change request;

means for transmitting, by the first instance based on the data change request, via the network interface, a data change validation request message to the identified one or more remote instances;

means for receiving, by the first instance via the network interface responsive to the data change validation request message, a validation data message from at least one of the identified one or more remote instances, each of the received validation data messages comprising data indicative of a response to the data change validation request message as being validated or not;

means for determining, by the first instance, based on the received validation data messages, that all of the identified one or more remote instances have validated the data change request;

when all of the identified one or more remote instances have validated the data change request, means for updating, by the first instance, the shared data structure with the data change request; and when less than all of the identified one or more instances have validated the data change request, means for not updating, by the first instance, the shared data structure with the data change request.

* * * * *